(12) United States Patent
Kim et al.

(10) Patent No.: US 8,259,273 B2
(45) Date of Patent: *Sep. 4, 2012

(54) LIQUID CRYSTALS AND LIQUID CRYSTAL DISPLAY APPARATUS EMPLOYING THE SAME

(75) Inventors: Hyun-Wuk Kim, Asan-si (KR); Jae-Jin Lyu, Yongin-si (KR); Yong-Kuk Yun, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/073,492

(22) Filed: Mar. 28, 2011

(65) Prior Publication Data

US 2011/0170044 A1 Jul. 14, 2011

Related U.S. Application Data

(63) Continuation of application No. 12/032,273, filed on Feb. 15, 2008, now Pat. No. 7,936,430.

(30) Foreign Application Priority Data

| Feb. 20, 2007 | (KR) | ........................ 10-2007-0017048 |
| Jul. 20, 2007 | (KR) | ........................ 10-2007-0073093 |

(51) Int. Cl.
*G02F 1/1343* (2006.01)
*G02F 1/1337* (2006.01)
*C09K 19/30* (2006.01)
*C09K 19/12* (2006.01)

(52) U.S. Cl. ......... 349/143; 349/130; 349/132; 428/1.1; 252/299.63; 252/299.66

(58) Field of Classification Search ................. 252/299, 252/63, 299.66; 349/130, 132, 143; 428/1.1
See application file for complete search history.

(56) References Cited

U.S. PATENT DOCUMENTS

| 6,638,581 | B2 | 10/2003 | Heckmeier et al. |
| 6,896,939 | B2 | 5/2005 | Klasen-Memmer et al. |
| 6,969,542 | B2 | 11/2005 | Klasen-Memmer et al. |
| 7,936,430 | B2 * | 5/2011 | Kim et al. ..................... 349/143 |
| 2003/0017279 | A1 | 1/2003 | Klasen-Memmer et al. |

FOREIGN PATENT DOCUMENTS

| JP | 2001-139511 | 5/2001 |
| JP | 2003-073670 | 3/2003 |
| JP | 2003-327965 | 11/2003 |
| KR | 10-2001-0098942 | 11/2001 |
| KR | 10-2002-0050139 | 6/2002 |
| KR | 10-2003-0081164 | 10/2003 |

OTHER PUBLICATIONS

Non-Final Office Action of U.S. Appl. No. 12/032,273 issued on Aug. 9, 2010.

(Continued)

*Primary Examiner* — Shean Wu
(74) *Attorney, Agent, or Firm* — H.C. Park & Associates, PLC

(57) ABSTRACT

A liquid crystal includes about 60 wt % to about 80 wt % of a first compound material, about 2 wt % to about 15 wt % of a second compound material, and a neutral compound material. The first compound material has a dielectric anisotropy of a first polarity, and the second compound material has a dielectric anisotropy of a second polarity.

42 Claims, 11 Drawing Sheets

OTHER PUBLICATIONS

Notice of Allowance of U.S. Appl. No. 12/032,273 issued on Jan. 25, 2011.

Notice of Allowance of U.S. Appl. No. 12/346,218 issued on Mar. 10, 2011.

* cited by examiner

LIQUID CRYSTALS AND LIQUID CRYSTAL DISPLAY APPARATUS EMPLOYING THE SAME

CROSS-REFERENCE TO RELATED APPLICATIONS

This application is a continuation of U.S. patent application Ser. No. 12/032,273, filed on Feb. 15, 2008, and claims the benefit of and priority from Korean Patent Application No. 10-2007-0017048, filed on Feb. 20, 2007, and Korean Patent Application No. 10-2007-0073093, filed on Jul. 20, 2007 which are all hereby incorporated by reference for all purpose as if fully set forth herein.

BACKGROUND OF THE INVENTION

1. Field of the Invention

The present invention relates to display apparatus and, more particularly, to liquid crystals and a liquid crystal display apparatus employing the liquid crystals.

2. Discussion of the Background

A liquid crystal display (LCD) apparatus displays images using liquid crystals. The LCD apparatus includes first and second substrates facing each other with a liquid crystal layer therebetween. Further, first and second electrodes are disposed on the first and second substrates, respectively, and the liquid crystal layer is disposed between the first and second electrodes. Thus, when a voltage is applied to the first and second electrodes, the voltage generates an electric field that crosses the liquid crystal layer.

The liquid crystal layer includes liquid crystals, and the liquid crystals in the liquid crystal layer are aligned along a specific direction by the electric field. That is, the alignment direction of the liquid crystals is determined by the electric field. In this case, the transmittance of light penetrating the liquid crystal layer depends on the alignment of the liquid crystals. The LCD apparatus controls the alignment of the liquid crystals using a material property of the liquid crystal layer and displays visual images corresponding to the transmittance of the light.

The liquid crystal layer includes various compound materials, and the properties of the liquid crystal layer may change according to characteristics of each compound material. Further, the properties of the liquid crystal layer influence the overall operation of the LCD apparatus. For example, the first and second electrodes and the liquid crystal layer therebetween constitute a capacitor, and the capacitance of the capacitor depends on a dielectric constant of the liquid crystal layer. In this case, when the capacitance of the capacitor varies, the operational characteristics of the LCD apparatus may also change.

SUMMARY OF THE INVENTION

The present invention are provides a liquid crystal and a liquid crystal display apparatus employing the same.

Additional features of the invention will be set forth in the description which follows, and in part will be apparent from the description or may be learned by practice of the invention.

The present invention discloses a liquid crystal including about 60 wt % to 80 wt % of a first compound material, about 2 wt % to 15 wt % of a second compound material, and a neutral compound material. The first compound material has a dielectric anisotropy of a first polarity, and the second compound material has a dielectric anisotropy of a second polarity.

The present invention also discloses a liquid crystal display apparatus including a first substrate having a pixel area and a second substrate facing the first substrate. A plurality of liquid crystals is disposed between the first and second substrates. Each liquid crystal includes about 60 wt % to 80 wt % of a first compound material, about 2 wt % to 15% of a second compound material, and a neutral compound material. The first compound material has a dielectric anisotropy of a first polarity, and the second compound material has a dielectric anisotropy of a second polarity.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
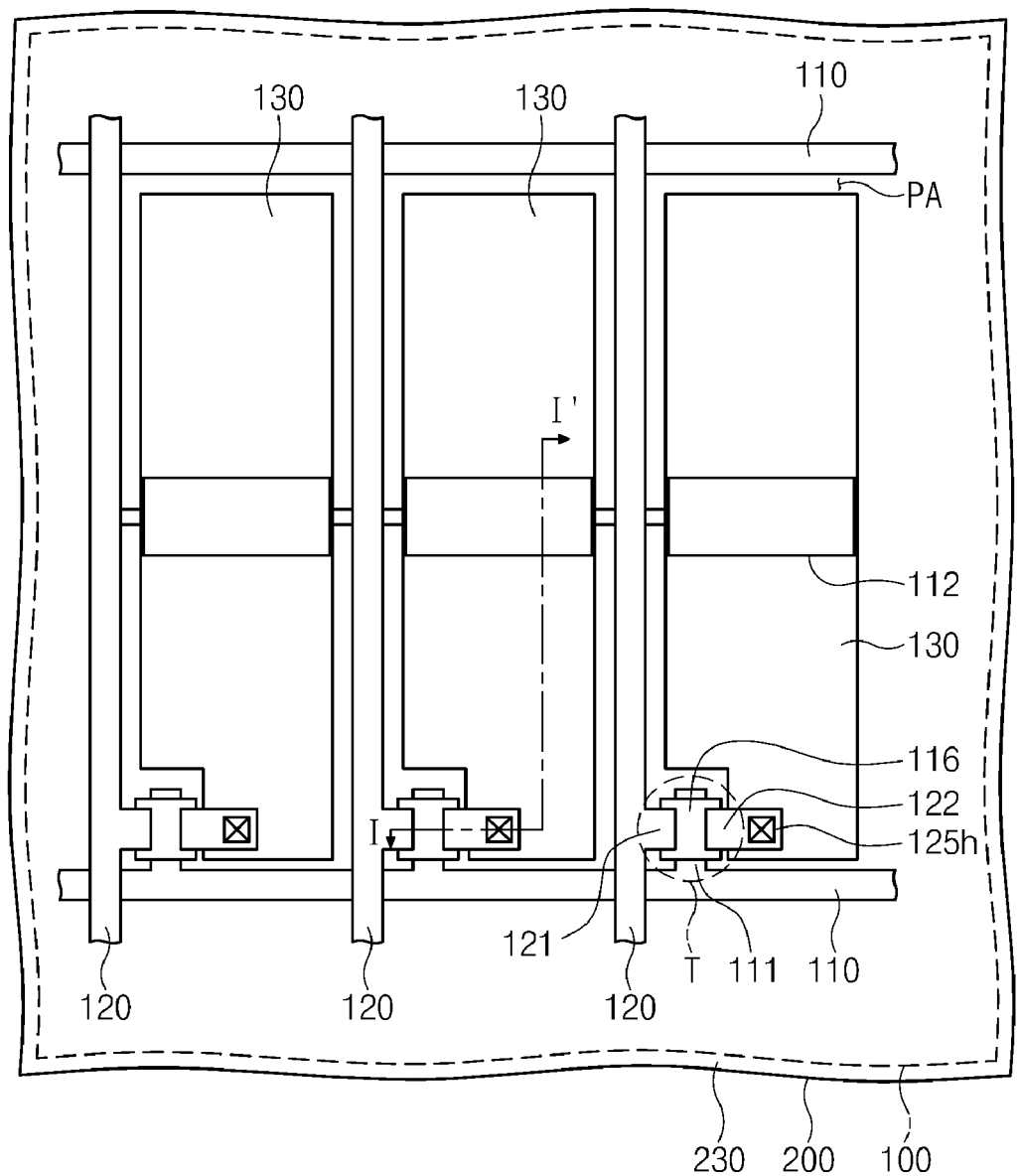
FIG. 1 is a plan view showing a liquid crystal display apparatus according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is a plan view showing a liquid crystal display (LCD) apparatus according to an exemplary embodiment of the present invention.

Referring to FIG. 1, first and second substrates 100 and 200 are provided. Gate lines 110 and data lines 120 are disposed on the first substrate 100, and pixel areas PA are respectively defined at crossings of the gate lines 110 and the data lines 120. Each gate line 110 may have the same configuration and function as the other gate lines 110, and each data line 120 may have the same configuration and function as the other data lines 120. Similarly, each pixel area PA may have the same configuration and function as the other pixel areas PA. Thus, a single gate line 110, a single data line 120, and a single pixel area PA are described below.

Each pixel area PA may include a storage electrode 112, a thin film transistor T, and a pixel electrode 130. A storage electrode 112 may be disposed at a central region of each pixel area PA, and all of the storage electrodes 112 in the pixel areas PA may be connected to each other. The thin film transistor T may include a gate electrode 111, a semiconductor pattern 116, a source electrode 121, and a drain electrode 122. The gate electrode 111 may be branched from the gate line 110, and the source electrode 121 may be branched from the data line 120. The drain electrode 122 may be disposed to face the source electrode 121 and connected to the pixel electrode 130 through a contact hole 125h. A common electrode 230 may be disposed on the second substrate 200 and may face the pixel electrode 130.

Figure 2A:
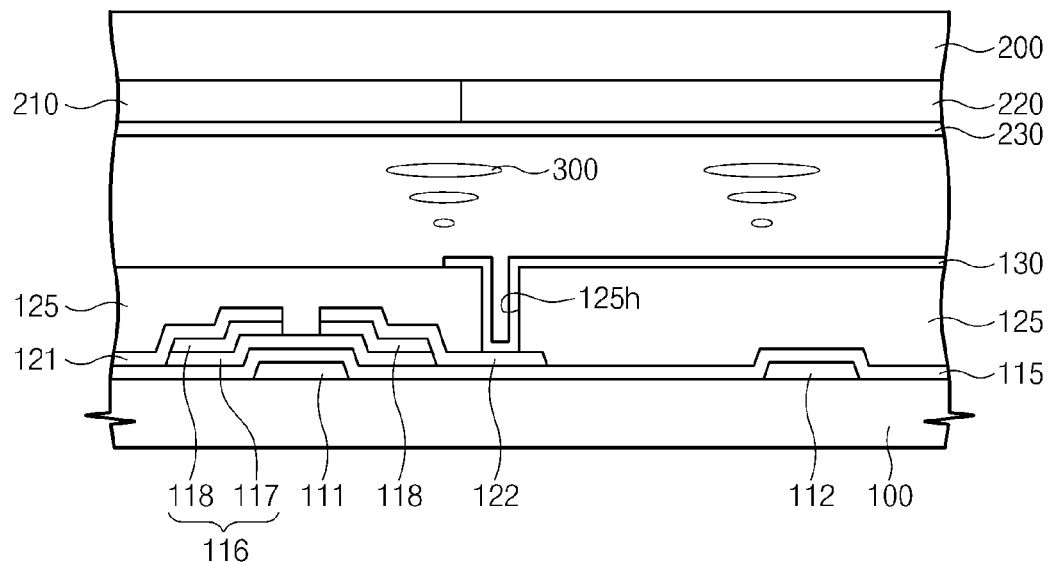
FIG. 2A and FIG. 2B are cross sectional views taken along line I-I' of FIG. 1 to show the operation of the liquid crystal display apparatus shown in FIG. 1.
Figure 2B:
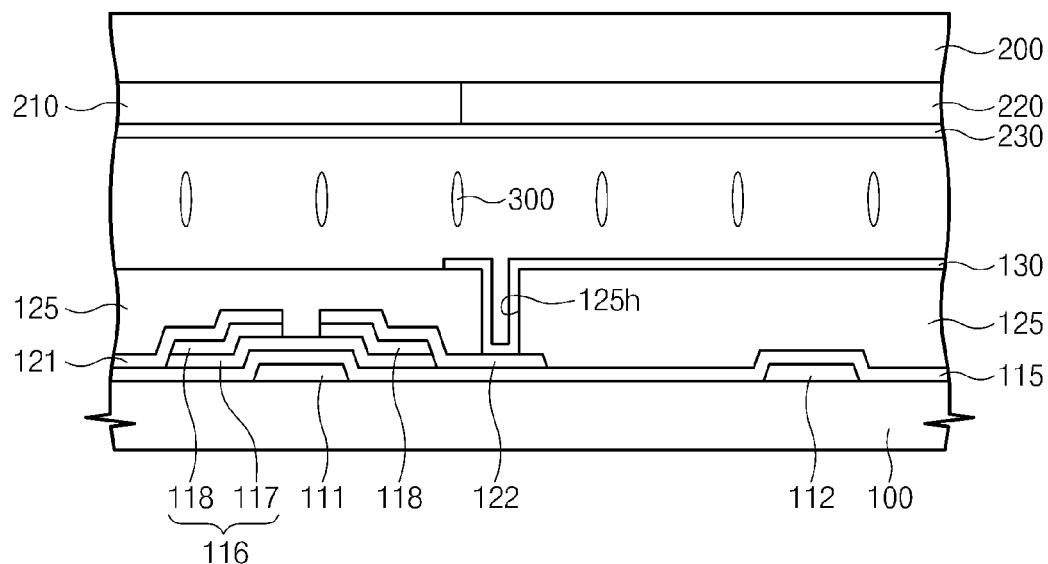

FIG. 2A and FIG. 2B are cross sectional views taken along the line I-I' of FIG. 1 to show the operation of the LCD apparatus shown in FIG. 1.

Referring to FIG. 1 and FIG. 2A, the gate electrode 111 and the storage electrode 112 may be located at the same level on the first substrate 100. The source and drain electrodes 121 and 122 may be disposed over the gate electrode 111, and the pixel electrode 130 may be disposed over the drain electrode 122. A gate insulating layer 115 and a protection layer 125 may be disposed between the gate electrode 111 and the pixel electrode 130. The gate insulating layer 115 may cover the gate electrode 111 and the storage electrode 112, which are spaced apart from each other. Further, the gate insulating layer 115 may extend to cover the first substrate 100. The protection layer 125 may be disposed over the source and drain electrodes 121 and 122. Moreover, the protection layer 125 may extend to cover the first substrate 100. The drain electrode 122 may be exposed through the contact hole 125h, which penetrates the protection layer 125. The pixel electrode 130 on the protection layer 125 may be connected to the drain electrode 122 through the contact hole 125h.

The semiconductor pattern 116 may overlap with the gate electrode 111. Further, the semiconductor pattern 116 may be disposed between the source electrode 121 and the gate insulating layer 115 and between the drain electrode 122 and the gate insulating layer 115. The semiconductor pattern 116 may include an active layer 117 covering the gate electrode 111 and a pair of ohmic contact layers 118 spaced apart from each other. One ohmic contact layer 118 may be disposed between the source electrode 121 and one end of the active layer 117, and the other ohmic contact layer 118 may be disposed between the drain electrode 122 and the other end of the active layer 117.

An optical blocking layer pattern 210 and a color filter 220 may be disposed between the second substrate 200 and the common electrode 230. The optical blocking layer pattern 210 may have an opening that exposes the common electrode 230 in the pixel area PA and prevents light from being transmitted through an edge of the pixel area PA. The color filter 220 may fill the opening of the optical blocking layer pattern 210, thereby generating a color image.

A liquid crystal layer including liquid crystals 300 may be disposed between the pixel electrode 130 and the common electrode 230. Each liquid crystal 300 may have a length greater than a width thereof. The alignment direction of the liquid crystals 300 may be defined on the basis of the length direction thereof. For example, it will be understood that when the liquid crystals 300 are referred to as being "parallel" to the substrates 100 and 200, the length direction of the liquid crystals 300 is parallel to the substrates 100 and 200. Further, it will be understood that when the liquid crystals 300 are referred to as being "vertical" to the substrates 100 and 200, the length direction of the liquid crystals 300 is perpendicular to the substrates 100 and 200.

Each liquid crystal 300 may have dielectric anisotropy. That is, the dielectric constant along the length direction of the liquid crystal 300 may be different from that along the width direction of the liquid crystal 300. When the length directional dielectric constant is greater than the width directional dielectric constant, the liquid crystal 300 has positive dielectric anisotropy. On the other hand, when the length directional dielectric constant is less than the width directional dielectric constant, the liquid crystal 300 has negative dielectric anisotropy. If a voltage is applied between the common electrode 230 and the pixel electrode 130, an electric field crossing the liquid crystals 300 may be generated. In this case, the alignment of the liquid crystals 300 may depend on the dielectric anisotropy thereof. For example, when the liquid crystals 300 have positive dielectric anisotropy, the liquid crystals 300 may be arranged parallel to the electric field. On the other hand, when the liquid crystals 300 have negative dielectric anisotropy, the liquid crystals 300 may be arranged perpendicular to the electric field.

When the thin film transistor T is turned off in an operation mode of the liquid crystal display apparatus, an electric field is not applied to the liquid crystals 300. In this case, if the liquid crystals 300 have positive dielectric anisotropy, the liquid crystals 300 may be arranged parallel to the substrates 100 and 200 (e.g., the pixel electrode 130 and the common electrode 230). However, lowermost liquid crystals 300 adjacent to the pixel electrode 130 may be arranged perpendicular to uppermost liquid crystals 300 adjacent to the common electrode 230 when viewed from the plan view of FIG. 1, and intermediate liquid crystals 300 between the lowermost liquid crystals 300 and the uppermost liquid crystals 300 may be arranged to have a twisted structure.

First and second polarizing plates (not shown) may be disposed below and above a panel including the substrates 100 and 200 and the liquid crystals 300, respectively, and light may be irradiated onto the bottom surface of the second substrate 200 through the first polarizing plate. The light may travel through the liquid crystals 300 having the twisted structure, and the phase of the light may be delayed when the light travels through the liquid crystals 300. The phase-delayed light may be output through the second polarizing plate and may have a white color.

Referring to FIG. 1 and FIG. 2B, the thin film transistor T may be turned on, and a data voltage and a common voltage may be applied to the pixel electrode 130 and the common electrode 230, respectively. The data voltage may change each frame according to an image to be displayed, and the common voltage may have a constant value. A difference between the data voltage and the common voltage may generate an electric field crossing the liquid crystals 300. Thus, the liquid crystals 300 may be arranged parallel to the electric field since the liquid crystals 300 have positive dielectric anisotropy, as described above. That is, the liquid crystals 300 may be arranged perpendicular to the pixel electrode 130 and the common electrode 230, as shown in FIG. 2B. In this case, if light is irradiated toward the second substrate 200 as described with reference to FIG. 2A, the light may maintain the initial phase thereof without any delay while the light travels through the liquid crystals 300 perpendicular to the pixel electrode 130 and the common electrode 230. Hence, the non phase-delayed light may be absorbed by the second polarizing plate, thereby displaying a black color.

In the above-mentioned operation, a storage capacitor may be provided in each pixel area PA to maintain the data voltage applied to the pixel electrode 130 for a set duration. The storage capacitor may include the storage electrode 112, the pixel electrode 130 over the storage electrode 112, and a dielectric layer disposed between the storage electrode 112 and the pixel electrode 130. The dielectric layer of the storage capacitor may include the gate insulating layer 115 and the protection layer 125.

In some cases, one or more parasitic capacitors other than the storage capacitor may exist in the pixel area PA. For example, the gate electrode 111, the drain electrode 122, and the gate insulating layer 115 therebetween may constitute the parasitic capacitor. The parasitic capacitor may cause a malfunction of the liquid crystal display apparatus. The charge of the parasitic capacitor may decrease by the data voltage applied to the pixel electrode 130 when the thin film transistor T is turned off. This phenomenon is referred to as "kick back". The voltage variation ($\Delta Vkb$) due to the kick back may be calculated using the following equations 1, 2, and 3.

$$\Delta Vkb = V1 - V2 \quad \text{(equation 1)}$$

$$V1 = (Cgs \times \Delta V12) \div (Cst + Clc1 + Cgs) \quad \text{(equation 2)}$$

$$V2 = (Cgs \times \Delta V12) \div (Cst + Clc2 + Cgs) \quad \text{(equation 3)}$$

wherein, "Cgs" denotes a capacitance of the parasitic capacitor, and "$\Delta V12$" denotes a voltage difference between a voltage applied to the pixel electrode 130 during an on-state of the thin film transistor T and a voltage induced at the pixel electrode 130 during an off-state of the thin film transistor T. Further, "Cst" denotes a capacitance of the storage capacitor, and "Clc1" and "Clc2" denote a capacitance of a liquid crystal capacitor during the off-state of the thin film transistor T and a capacitance of the liquid capacitor during the on-state of the thin film transistor T, respectively. The liquid crystal capacitor may include the pixel electrode 130, the common electrode 230, and the liquid crystal layer therebetween. The capacitance of the liquid crystal capacitor may vary according to the alignment of the liquid crystals 300 in the liquid crystal layer.

As can be seen from equations 1, 2, and 3, the voltage difference between the is voltages V1 and V2 should be reduced to decrease the voltage variation $\Delta Vkb$ due to the kick back, and the capacitance difference between the liquid crystal capacitances Clc1 and Clc2 should be reduced to decrease the voltage difference between the voltages V1 and V2. In the present exemplary embodiment, each liquid crystal 300 may include a plurality of compound materials that are present at weight ratios that minimize voltage variation ($\Delta Vkb$) due to kick back. As a result, high quality images may be produced.

In an exemplary embodiment, the liquid crystals 300 may have positive dielectric anisotropy. Further, each liquid crystal 300 may include a positive compound material, a negative compound material, and a neutral compound material. The positive compound material may dielectrically have positive polarity, and the negative compound material may dielectrically have negative polarity. The neutral compound material may be dielectrically neutral. The positive compound material influences the length directional dielectric constant of the liquid crystals 300. That is, if the amount of the positive compound material increases, the length directional dielectric constant of the liquid crystal 300 may increase and the liquid crystal 300 may have positive dielectric anisotropy. Thus, the liquid crystal 300 having positive dielectric anisotropy may be arranged parallel to an electric field applied to the liquid crystal 300. Similarly, the negative compound material influences the width directional dielectric constant of the liquid crystals 300. That is, if the amount of the negative compound material increases, the width directional dielectric constant of the liquid crystal 300 may increase and the liquid crystal 300 may have negative dielectric anisotropy. Thus, the liquid crystal 300 having negative dielectric anisotropy may be arranged perpendicular to an electric field applied to the liquid crystal 300.

In the present exemplary embodiment, each liquid crystal 300 may include a large is amount of positive compound material and a small amount of negative compound material. That is, the amount of the positive compound material may be greater than that of the negative compound material. Thus, the liquid crystals 300 may exhibit positive dielectric anisotropy. However, the liquid crystals 300 may also have a specific property that relates to the negative compound material.

As described above, the liquid crystal capacitances Clc1 and Clc2 indicate a capacitance of the liquid crystal capacitor during the off-state and the on-state of the thin film transistor T, respectively. That is, one of the liquid crystal capacitances Clc1 and Clc2 may correspond to a capacitance of the liquid crystal capacitor while the liquid crystals 300 are arranged parallel to the electrodes 130 and 230, as shown in FIG. 2A, and the other may correspond to a capacitance of the liquid crystal capacitor while the liquid crystals 300 are arranged perpendicular to the electrodes 130 and 230, as shown in FIG. 2B. If the liquid crystals 300 do not contain the negative compound material, the capacitance difference between the liquid crystal capacitances Clc1 and Clc2 may increase and the voltage variation $\Delta Vkb$ due to kick back may also increase. However, according to the present exemplary embodiment, each liquid crystal 300 may include the negative compound material to reduce the voltage variation $\Delta Vkb$ due to kick back. Thus, the image quality of the liquid crystal display apparatus may be enhanced.

Each liquid crystal 300 may include an appropriate weight ratio of the negative compound material, for example, 2 to 7 wt %. If the weight ratio of the negative compound material is too low, the beneficial influences of the negative compound material may not be exhibited. In contrast, if the weight ratio of the negative compound material is too high, the liquid crystal 300 may exhibit negative dielectric anisotropy rather than positive dielectric anisotropy.

The neutral compound material influences a rotational viscosity of the liquid crystal 300. In general, if the amount of the positive compound material and/or the negative compound material increases, the rotational viscosity of the liquid crystal 300 may also increase. Accordingly, the neutral compound material may lower the rotational viscosity of the liquid crystals 300, thereby enhancing the alignment speed of the liquid crystals 300 in response to an electric field. As a result, the neutral compound material may improve the operation speed of the liquid crystal display apparatus.

The positive compound material may include at least one compound expressed by one of the following chemical formulas 1, 2, 3, 4, 5, 6, 7, and 8. Further, the negative compound material may include at least one compound expressed by one of the following chemical formulas 9, 10, 11, 12, and 13. Moreover, the neutral compound material may include at least one compound expressed by one of the following chemical formulas 14, 15, 16, 17, and 18.

Chemical Formula 1

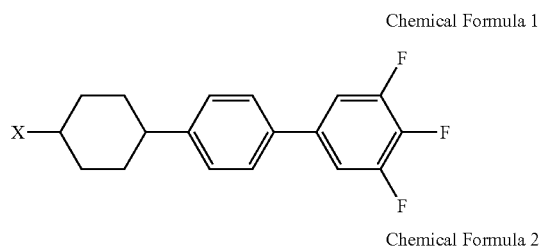

Chemical Formula 2

Chemical Formula 3

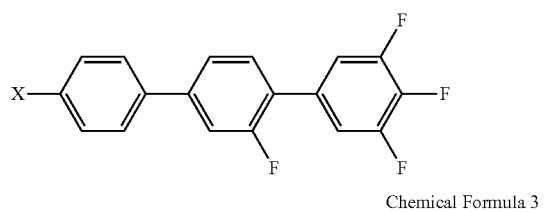

Chemical Formula 4

Chemical Formula 5

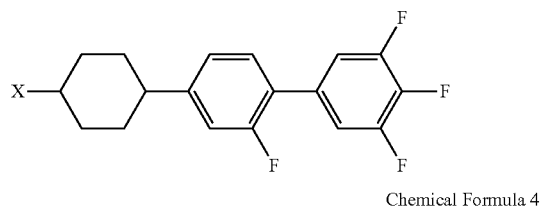

Chemical Formula 6

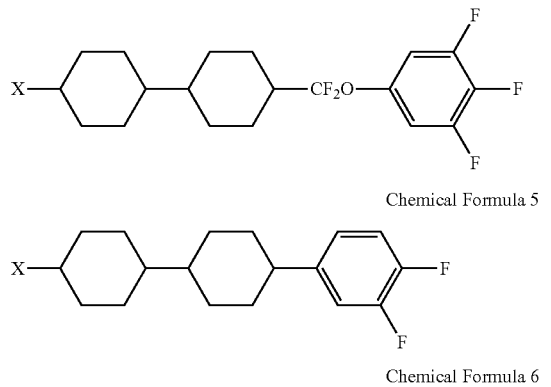

Chemical Formula 7

Chemical Formula 8

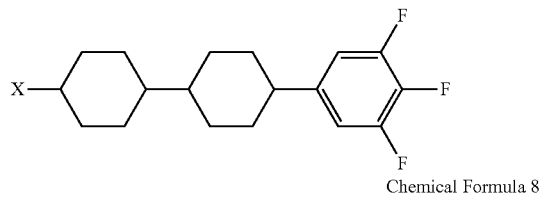

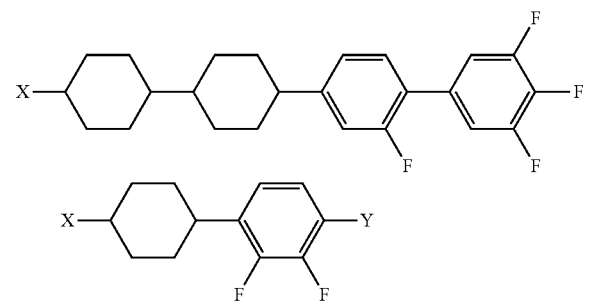

wherein, "Y" denotes an alkoxy group.

Chemical Formula 9

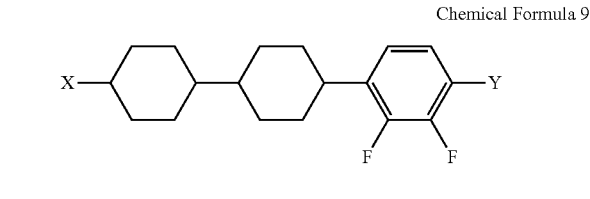

wherein, "Y" denotes an alkoxy group.

Chemical Formula 10

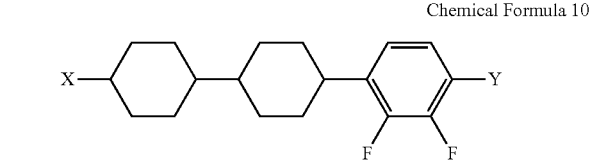

wherein, "Y" denotes an alkyl group.

Chemical Formula 11

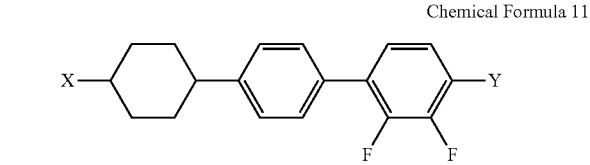

wherein, "Y" denotes an alkoxy group.

Chemical Formula 12

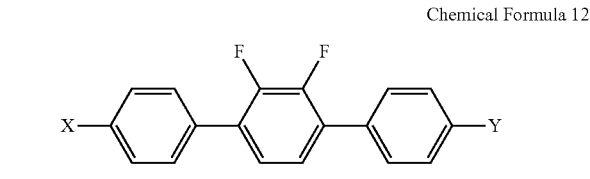

wherein, "Y" denotes an alkyl group.

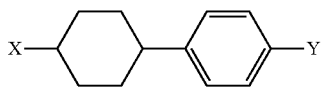

Chemical Formula 13 wherein, "Y" denotes an alkyl group.

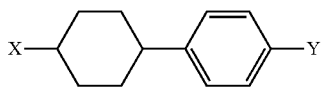

Chemical Formula 14 wherein, "Y" denotes an alkoxy group.

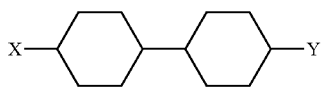

Chemical Formula 15 wherein, "Y" denotes an alkyl group.

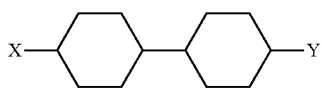

Chemical Formula 16 wherein, "Y" denotes an alkoxy group.

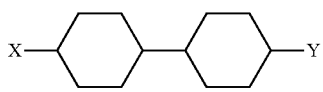

Chemical Formula 17 wherein, "Y" denotes an alkenyl group.
Chemical Formula 18

In the chemical formulas 1, 2, 3, 4, 5, 6, 7, 8, 9, 10, 11, 12, 13, 14, 15, 16, 17, and 18, "X" indicates a hydrocarbon having 2, 3, 4, or 5 carbon molecules.

The neutral compound material does not include an element, such as a fluorine atom, which has a high electronegativity, to exhibit polarity. In contrast, the positive compound material and the negative material may include one or more fluorine atoms, and the bonding sites of the fluorine atoms of the positive compound material may be different from those of the negative compound material. For example, the fluorine atoms of the positive compound material may be bonded at right sides of the positive compound material. However, the fluorine atom of the positive compound material, which is located at a right end of the positive compound material, may be replaced with an alkoxy group or an alkyl group to provide the negative compound material.

Figure 3:
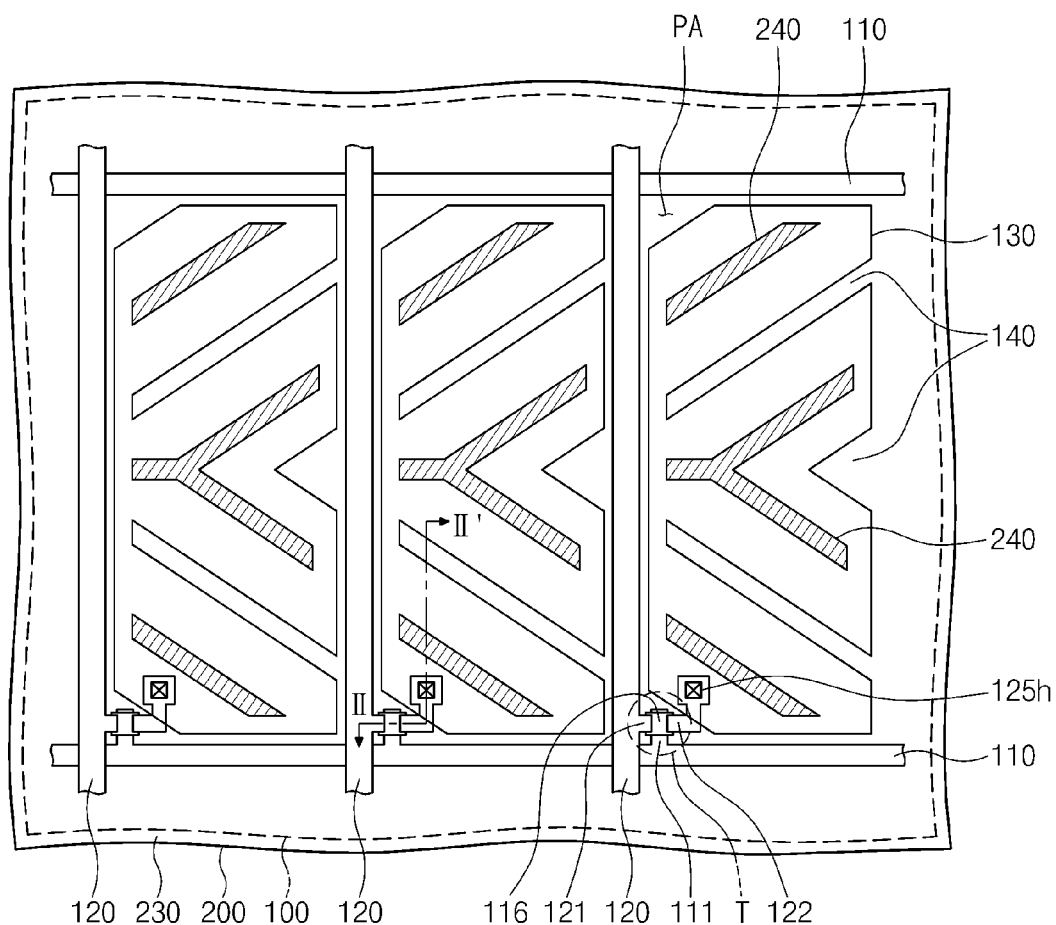
FIG. 3 is a plan view showing a liquid crystal display apparatus according to another exemplary embodiment of the present invention.

FIG. 3 is a plan view showing a liquid crystal display apparatus according to another exemplary embodiment of the present invention. The same components as described in the aforementioned exemplary embodiment are indicated using the same reference numerals, and the descriptions to the components described in the previous exemplary embodiment will be omitted or briefly mentioned.

Referring to FIG. 3, first and second substrates 100 and 200 are provided to face each other. Gate lines 110 and data lines 120 are disposed on the first substrate 100, and pixel areas PA are respectively defined at crossings of the gate lines 110 and the data lines 120. Each pixel area PA may include a thin film transistor T and a pixel electrode 130. The thin film transistor T may include a gate electrode 111, a semiconductor pattern 116, a source electrode 121, and a drain electrode 122. A common electrode 230 is disposed on the second substrate 200 to face the pixel electrode 130. The pixel electrode 130 and the common electrode 230 may include first and second domain dividers 140 and 240, respectively.

Figure 4A:
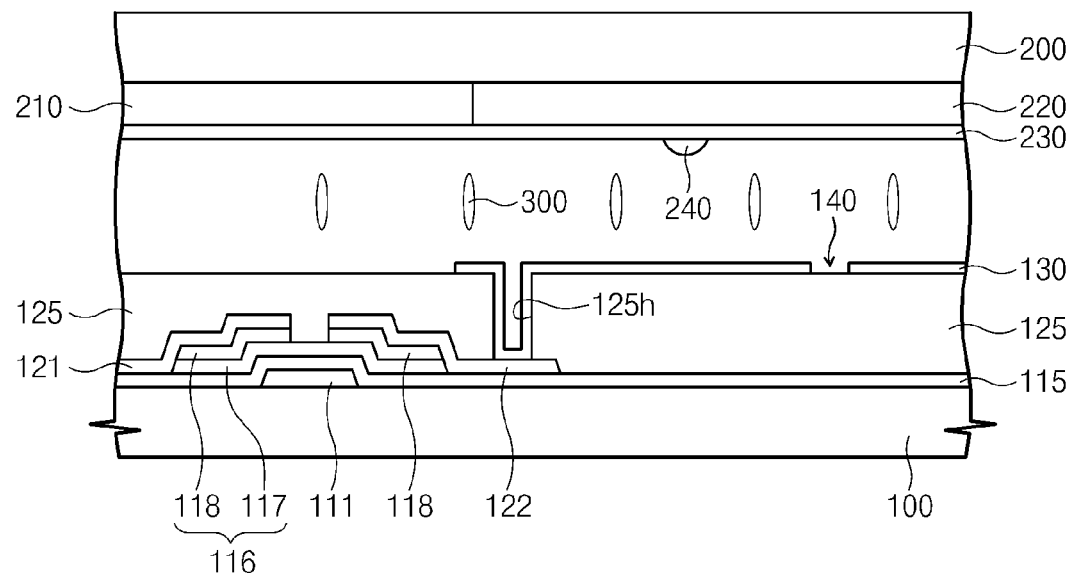
FIG. 4A and FIG. 4B are cross sectional views taken along line II-II' of FIG. 3 to show the operation of the liquid crystal display apparatus shown in FIG. 3.
Figure 4B:
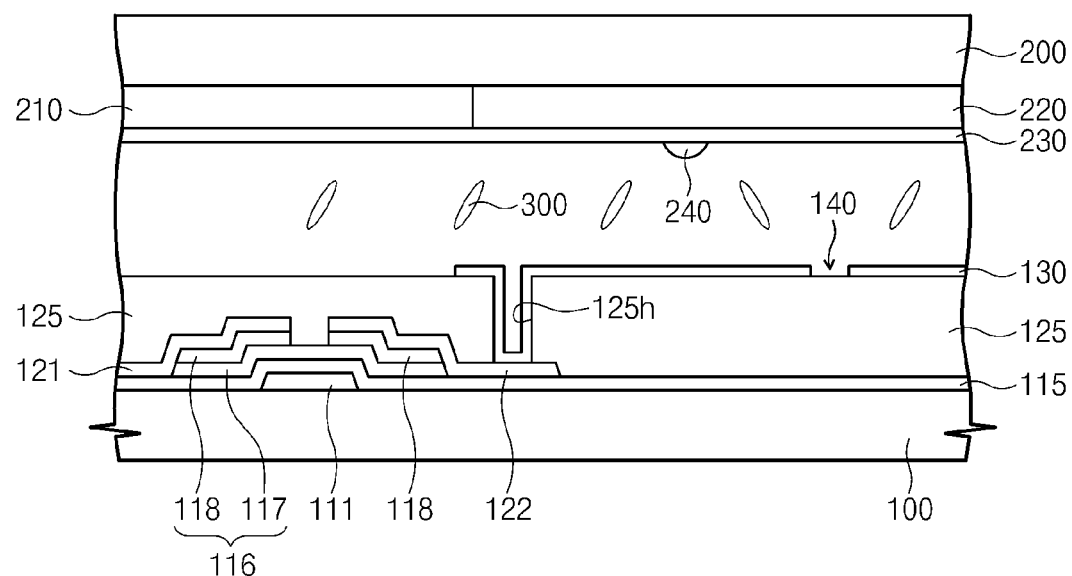

FIG. 4A and FIG. 4B are cross sectional views taken along line II-II' of FIG. 3 to show the operation of the liquid crystal display apparatus shown in FIG. 3.

Referring to FIG. 3 and FIG. 4A, a liquid crystal layer including a number of liquid crystals 300 may be disposed between the pixel electrode 130 and the common electrode 230. The liquid crystals 300 may have negative dielectric anisotropy, and the liquid crystals 300 may be arranged perpendicular to the pixel electrode 130 and the common electrode 230 while the thin film transistor T is turned off.

Light may be irradiated from a region under the first substrate 100 toward a bottom surface of the first substrate 100. The light may be irradiated onto the bottom surface of the first substrate 100 through a first polarizing plate (not shown) that is attached to the first substrate 100. When the thin film transistor T is turned off, light may pass through the liquid crystals 300, which are vertically aligned, and the light that passes through the liquid crystals 300 may be absorbed into a second polarizing plate (not shown) that is attached to the second substrate 200. In this case, the liquid crystal display apparatus may exhibit a black color.

Referring to FIG. 3 and FIG. 4B, an electric field may be provided between the common electrode 230 and the pixel electrode 130. The magnitude and/or direction of the electric field may vary according to shapes and/or locations of the first and second domain dividers 140 and 240. As shown in FIG. 4A and FIG. 4B, the first domain divider 140 includes openings formed through some portions of the pixel electrode 130, and the second domain divider 240 includes protrusions attached on a bottom surface of the common electrode 230. In another exemplary embodiment, the first domain divider 140 may include protrusions attached on a top surface of the pixel electrode 130, and the second domain divider 240 may include openings formed through some portions of the common electrode 230. In still another exemplary embodiment, both the first and second domain dividers 140 and 240 may include openings or protrusions.

All of the protrusions and the openings may be insulating regions. Thus, when an electric field is provided between the common electrode 230 and the pixel electrode 130, the electric field adjacent to the domain dividers 140 and 240 may become weak. In this case, the domain dividers 140 and 240 may act as boundary regions on the plan view of FIG. 3, and the overall electric field between the common electrode 230 and the pixel electrode 130 may be divided into a plurality of domains by the domain dividers 140 and 240. Hence, the alignment direction of the liquid crystals 300, which are located at one side of a specific domain divider among the domain dividers 140 and 240, may be different from that of the liquid crystals 300, which are located at the other side of the specific domain divider. For example, the liquid crystals 300 located at a right side of the first domain divider 140 may be aligned to tilt to the right and the liquid crystals 300 located at a left side of the first domain divider 140 may be aligned to tilt to the left, as shown in FIG. 4B. Thus, each pixel area PA may be divided into several domains by the domain dividers 140 and 240, as described above. In this case, the liquid crystals 300 in each domain may be aligned in the same direction.

While the electric field is applied to the liquid crystals 300, light may be irradiated toward the first substrate 100 through the first polarizing plate, as described with reference to FIG. 4A. In this case, the light may travel through the tilted liquid crystals 300, and the phase of the light may be delayed when the light travels through the liquid crystals 300. The phase-delayed light may be output through the second polarizing plate and may have a white color. According to the aforementioned exemplary embodiments, the liquid crystals 300 may be aligned along two or more different directions in the domains. Thus, light may travel in several different directions through the liquid crystals 300, thereby enhancing the viewing angle of the liquid crystal display apparatus.

In the aforementioned exemplary embodiment, the liquid crystals 300 may have negative dielectric anisotropy. Further, each liquid crystal 300 may include a negative compound material, a positive compound material, and a neutral compound material, as described above. The negative compound material may include at least one compound expressed by one of the chemical formulas 9, 10, 11, 12, and 13, and the positive compound material may include at least one of compound expressed by one of the chemical formulas 1, 2, 3, 4, 5, 6, 7, and 8. The liquid crystals 300 may include a weight ratio of about 2 to 7 wt % of the positive compound material. The positive compound material may reduce the capacitance difference between the liquid crystal capacitances $Clc1$ and $Clc2$, thereby preventing kick back. As a result, the liquid crystal display apparatus may produce high quality images. The neutral compound material may include at least one compound expressed by one of the chemical formulas 14, 15, 16, 17, and 18. The neutral compound material may lower the rotational viscosity of the liquid crystals 300, thereby improving the operation speed of the liquid crystal display apparatus.

In yet another exemplary embodiment, the storage electrodes 112 may be omitted from the liquid crystal display apparatus of FIG. 1, FIG. 2A, and FIG. 2B. In the exemplary embodiment shown in FIG. 1, FIG. 2A, and FIG. 2B, the storage electrode 112 may include the same material as the gate electrode 111. For example, the storage electrode 112 of the exemplary embodiment shown in FIG. 1, FIG. 2A, and FIG. 2B may include an opaque conductive material layer containing a metal layer. Thus, if the storage electrode 112 is disposed in the pixel area PA, an aperture ratio of the liquid crystal display apparatus may be degraded. However, the liquid crystal display apparatus according to the present exemplary embodiment may not employ any storage electrodes, which may prevent the aperture ratio of the LCD apparatus from being degraded. In this case, the storage capacitor may be omitted. The storage capacitor may be used to maintain the data voltage applied to the pixel electrode 130 for a set duration, but is a component that can be omitted.

The liquid crystal display apparatus may operate at a high frame frequency of an image screen to prevent disadvantages due to the absence of the storage capacitors from occurring. For example, if the frame frequency of the LCD apparatus including the storage capacitors is 60 Hertz (Hz), the frame frequency of the LCD apparatus according to the present exemplary embodiment may be 120 Hz without the storage capacitors. When the LCD apparatus operates at the frame frequency of 60 Hz, a data voltage holding time for an image of a single frame may be about 0.0167 ($\frac{1}{60}$) seconds. In contrast, when the LCD apparatus operates at the frame frequency of 120 Hz, the data voltage holding time for an image of a single frame may be about 0.0083 ($\frac{1}{120}$) seconds. That is, the LCD apparatus may normally operate even without the storage capacitors when operating at the frame frequency of 120 Hz. This is because the data voltage holding time at the frame frequency of 120 Hz is merely one half of that at the frame frequency of 60 Hz.

Figure 5:
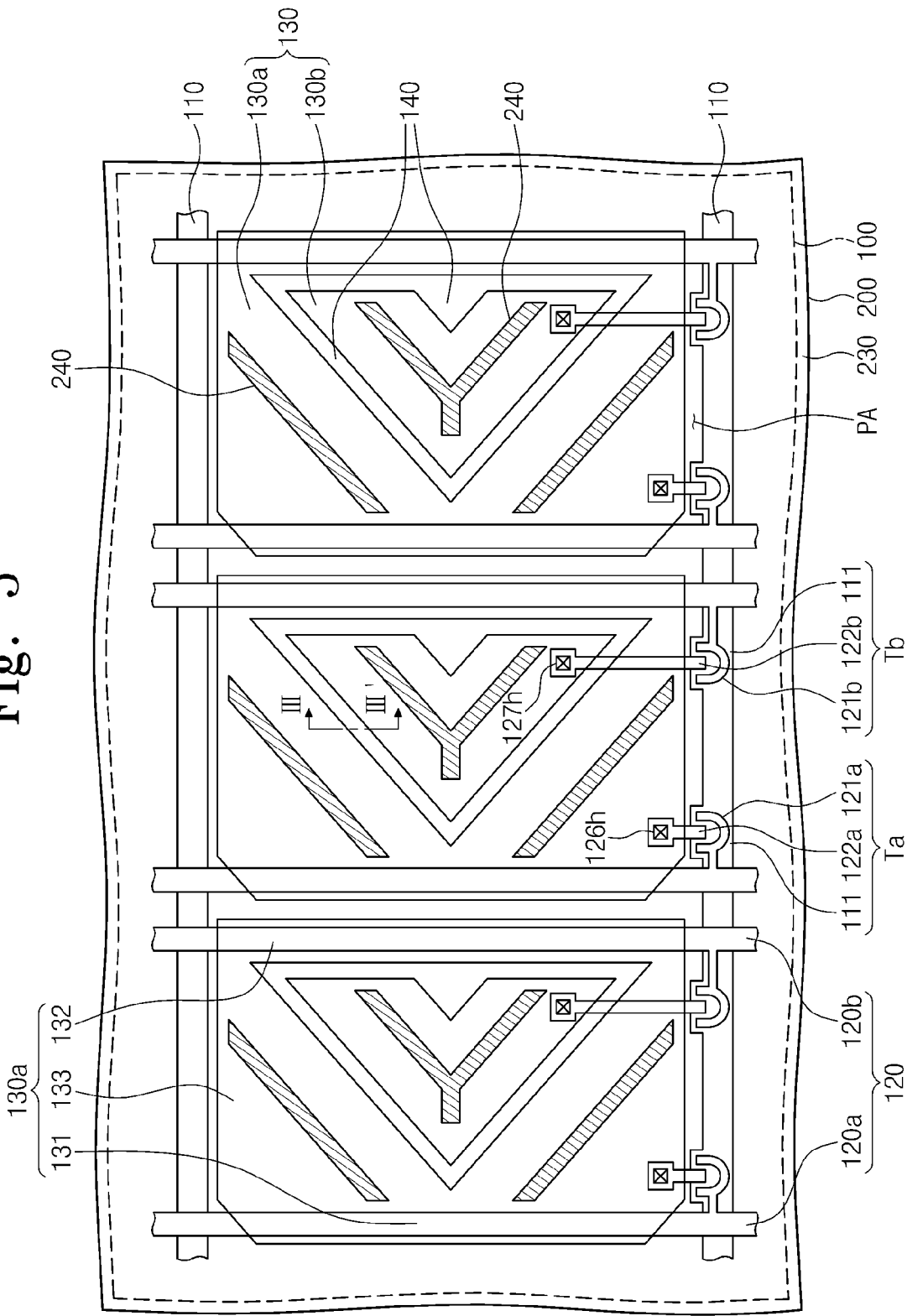
FIG. 5 is a plan view showing a liquid crystal display apparatus according to still another exemplary embodiment of the present invention.

FIG. 5 is a top plan view showing an LCD apparatus according to still another exemplary embodiment of the present invention. In this exemplary embodiment, the same components as described in the aforementioned embodiments are indicated using the same reference numerals, and the descriptions to the components described in the previous exemplary embodiments will be omitted or briefly mentioned.

Referring to FIG. 5, first and second substrates 100 and 200 are provided to face each other. Gate lines 110 and data lines 120 are disposed on the first substrate 100, and pixel areas PA are respectively defined at crossings of the gate lines 110 and the data lines 120. Each pixel area PA may include a first thin film transistor Ta, a second thin film transistor Tb, and a pixel electrode 130. Each data line 120 may include first and second data lines 120a and 120b, and the pixel area PA may be disposed between the first and second data lines 120a and 120b. The pixel electrode 130 may include a first pixel electrode 130a and a second pixel electrode 130b.

The first thin film transistor Ta may include a gate electrode 111, a first source electrode 121a, and a first drain electrode 122a. The first drain electrode 122a may be connected to the first pixel electrode 130a through a first contact hole 126h. The second thin film transistor Tb may include the gate electrode 111, a second source electrode 121b and a second drain electrode 122b. The second drain electrode 122b may be connected to the second pixel electrode 130b through a second contact hole 127h.

The first pixel electrode 130a may include a first sub pixel electrode 131, a second sub pixel electrode 132, and a third sub pixel electrode 133. The first and second sub pixel electrodes 131 and 132 may face each other, and the third sub pixel electrode 133 connects the first sub pixel electrode 131 with the second sub pixel electrode 132. The second pixel electrode 130b may be disposed between the first and second sub pixel electrodes 131 and 132.

The third sub pixel electrode 133 may be spaced apart from the gate line 110 and parallel to the gate line 110. The first sub pixel electrode 131 may overlap the first data line 120a, and the second sub pixel electrode 132 may overlap the second data line 120b. In this case, the pixel electrode 130 may occupy almost all of the pixel area PA since the pixel electrode 130 overlaps with the data line 120. This may increase the aperture ratio of the LCD apparatus. In another exemplary embodiment, the gate line 110 may also overlap an edge of the first pixel electrode 130a.

The first pixel electrode 130a may have a planar area that is greater than that of the second pixel electrode 130b. For example, the planar area of the first pixel electrode 130a may be twice that of the second pixel electrode 130b. A first data voltage and a second data voltage may be applied to the first and second pixel electrodes 130a and 130b, respectively. The first and second data voltages may be different from each other.

When a data signal is transmitted through the data line 120, a different voltage from the second data voltage may be applied to the second pixel electrode 130b. This may be due to a coupling capacitance between the data line 120 and the second pixel electrode 130b having a smaller area than the first pixel electrode 130a. Accordingly, in order to prevent the different voltage from the second data voltage from being applied to the second pixel electrode 130b, the first pixel electrode 130a may be disposed to overlap the data line 120. In this case, the first pixel electrode 130a may act as a shield electrode.

The pixel electrode 130 and the common electrode 230 may include a first domain divider 140 and a second domain divider 240, respectively. The first domain divider 140 may correspond to an opening formed through a portion of the pixel electrode 130. The opening may divide the pixel electrode 130 into first and second pixel electrodes 130a and 130b, which are spaced apart from each other. The second domain divider 240 may include one or more protrusions attached to a bottom surface of the common electrode 230 or an opening that penetrates the common electrode 230. The viewing angle of the LCD apparatus may be enhanced because of the presence of the first and second domain dividers 140 and 240.

Figure 6A:
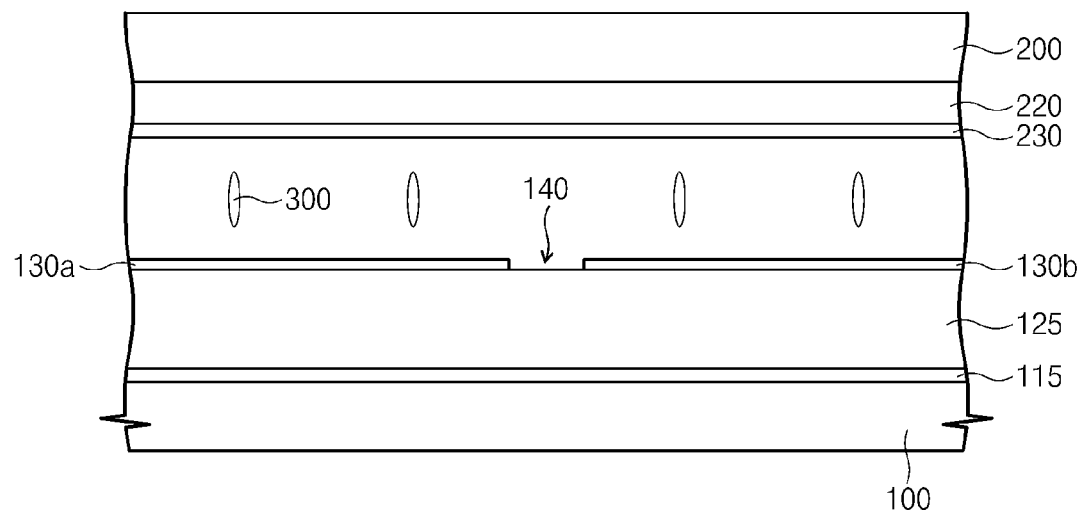
FIGS. 6A and 6B are cross sectional views taken along line III-III' of FIG. 5 to show the operation of the liquid crystal display apparatus shown in FIG. 5.
Figure 6B:
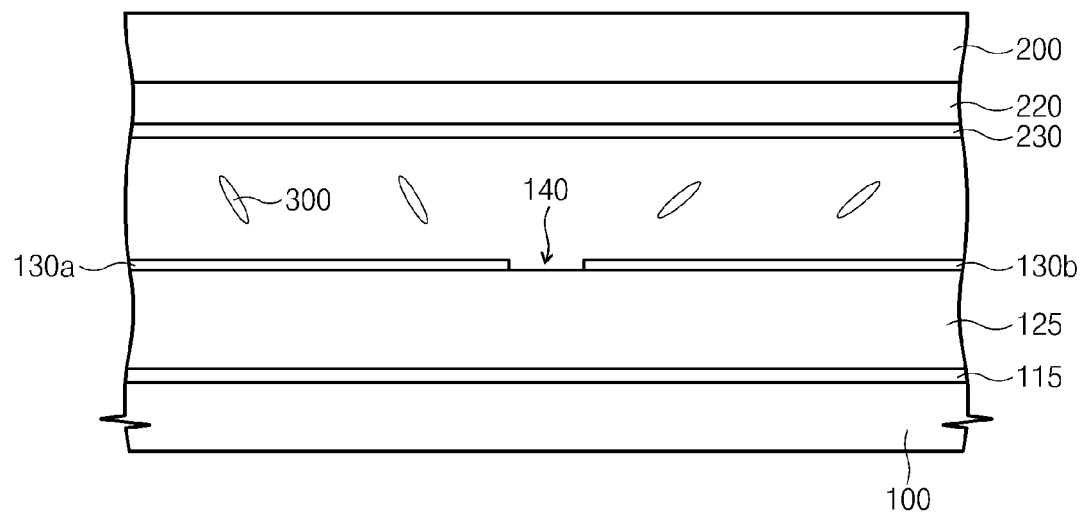

FIG. 6A and FIG. 6B are cross sectional views taken along line III-III' of FIG. 5 to show the operation of the LCD apparatus shown in FIG. 5.

Referring to FIG. 5 and FIG. 6A, a gate insulating layer 115 and a protection layer 125 may be sequentially stacked on a surface of the first substrate 100, which faces the second substrate 200. The first pixel electrode 130a and the second pixel electrode 130b may be disposed on the protection layer 125, and the first and second pixel electrodes 130a and 130b may be spaced apart from each other. A liquid crystal layer including the liquid crystals 300 may be disposed between the pixel electrode 130 and the common electrode 230, and the liquid crystals 300 may have negative dielectric anisotropy. Thus, the liquid crystals 300 may be arranged perpendicular to the pixel electrode 130 and the common electrode 230 when the first and second thin film transistors Ta and Tb are turned off. As a result, the corresponding pixel area PA of the LCD apparatus may generate a black color.

Referring to FIG. 5 and FIG. 6B, when the first and second thin film transistors Ta and Tb are turned on, first and second data voltages may be applied to the first and second pixel electrodes 130a and 130b, respectively. Further, a common voltage may be applied to the common electrode 230 while the first and second thin film transistors Ta and Tb are turned on. In this case, an electric field may be generated across the liquid crystal layer, and the liquid crystals 300 may be arranged to have a tilt with respect to the pixel electrode 130 and the common electrode 230. The electric field between the first pixel electrode 130a and the common electrode 230 may be different from that between the second pixel electrode 130b and the common electrode 230. This may be due to the presence of the first domain divider 140 between the first and second pixel electrodes 130a and 130b. Thus, the alignment direction of the tilted liquid crystals 300 on the first pixel electrode 130a may be different from that of the tilted liquid crystals 300 on the second pixel electrode 130b. In this case, the light transmitted through the tilted liquid crystals 300 on the first pixel electrode 130a may compensate the light transmitted through the tilted liquid crystals 300 on the second pixel electrode 130b, thereby improving the operation characteristics of the LCD apparatus.

The liquid crystals 300 may have negative dielectric anisotropy, and the liquid crystals 300 may include a negative compound material, a neutral compound material, and a positive compound material. The negative compound material may include at least one compound expressed by one of the chemical formulas 9, 10, 11, 12, and 13, and the positive compound material may include at least one compound expressed by one of the chemical formulas 1, 2, 3, 4, 5, 6, 7, and 8. Further, the neutral compound material may include at least one compound expressed by one of the chemical formulas 14, 15, 16, 17, and 18.

In the present exemplary embodiment, a storage electrode (112 of FIG. 1) may be omitted, and the LCD apparatus may be configured to operate at a frame frequency of 120 Hz.

A time duration for which the thin film transistors Ta and Tb are turned on at a frame frequency of 120 Hz may be one half of a time duration for which the thin film transistors are turned on at a frame frequency of 60 Hz. Thus, a charging rate of the data voltage at a frame frequency of 120 Hz may be reduced as compared to that of the data voltage at a frame frequency of 60 Hz. This is because the data voltage holding time of the LCD apparatus operating at a frame frequency of 120 Hz is one half of that of the LCD apparatus operating at a frame frequency of 60 Hz. The reduction of the charging rate may decrease of the transmittance of the LCD apparatus. However, according to the present exemplary embodiment, the storage electrode may be omitted. Hence, the transmittance of the LCD apparatus may not be reduced due to the absence of the storage electrode even if the LCD apparatus operates at a high frame frequency of 120 Hz.

In the event that the LCD apparatus does not employ the storage electrode, the storage capacitance (refer to "Cst" in the equations 2 and 3) may be reduced to increase the voltage variation $\Delta Vkb$ due to kick back. This disadvantage may be resolved by increasing the liquid crystal capacitances (refer to "Clc1" and "Clc2" in the equations 2 and 3). The liquid crystal capacitances may be increased by appropriately adjusting the composition of the liquid crystals 300.

If the liquid crystal capacitances Clc1 and Clc2 increase, the loading capacitances of the gate lines 110 and the data lines 120 may also increase. This may lead to an increase in the RC delay time of electrical signals, which are transmitted through the gate lines 110 and the data lines 120. However, the signal delay time may be minimized by employing the design schemes of the LCD apparatus shown in FIG. 5. Hereinafter, descriptions to the liquid crystal 300 including some components with an optimum composition (e.g., weight ratio) thereof will be developed.

The components and the corresponding weight ratios of three different liquid crystal samples S1, S2, and S3 are described in Table 1 below.

TABLE 1

| Components | Y | S1 | S2 | S3 |
|---|---|---|---|---|
| 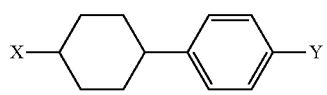 | Alkyl | 7 wt % | 10 wt % | 3-6 wt % |
| 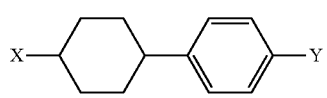 | Alkoxy | 6 wt % | — | Less than 2 wt % |

TABLE 1-continued

| Components | | Y | S1 | S2 | S3 |
|---|---|---|---|---|---|
| 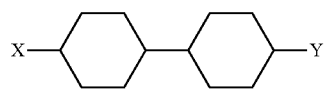 | | Alkyl<br>Alkoxy<br>Alkenyl | 17 wt %<br>—<br>— | 15 wt %<br>15 wt %<br>— | Less than 2 wt %<br>Less than 2 wt %<br>25-35 wt % |
| 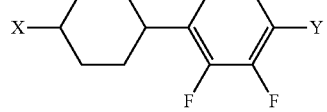 | | Alkoxy | 30 wt% | 14 wt % | 15-20 wt % |
| 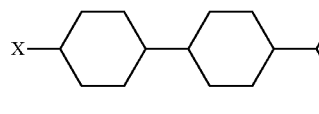 | | Alkoxy | 23 wt % | 18 wt % | 20-30 wt % |
| 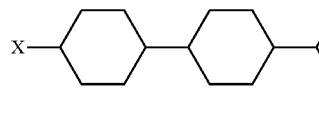 | | Alkyl | 17 wt % | 8 wt % | Less than 3 wt % |
| 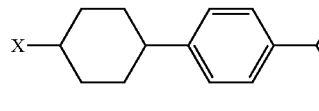 | | Alkoxy | — | 20 wt % | 15-25 wt % |
| 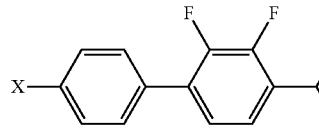 | | Alkyl | — | — | Less than 3 wt % |
| Positive Compound | | — | — | — | 2-7 wt % |

Referring to Table 1, the first sample S1 includes a neutral compound material including compounds expressed by chemical formulas 14, 15, and 16 and a negative compound material including compounds expressed by chemical formulas 9, 10, and 11. The second sample S2 includes a neutral compound material including compounds expressed by chemical formulas 14, 16, and 17 and a negative compound material including compounds expressed by chemical formulas 9, 10, 11, and 12. The third sample S3 includes a neutral compound material including compounds expressed by chemical formulas 14, 15, 16, 17, and 18, and the compound expressed by chemical formula 18 acts as a major component of the neutral compound material. Also, the third sample S3 further includes a negative compound material including compounds expressed by chemical formulas 9, 10, 11, 12, and 13, and compounds expressed by chemical formulas 9, 10, and 12 act as major components of the negative compound material. In addition, the third sample S3 further includes a positive compound material including at least one compound expressed by one of chemical formulas 1, 2, 3, 4, 5, 6, 7, and 8.

As described above, the third sample S3 includes the positive compound material, whereas each of the first and second samples S1 and S2 does not include any positive compound materials. The first sample S1 is different from the second sample S2 in terms of the kind and composition (e.g., the weight ratio) of the negative compound material. In particular, the content of the negative compound material in the first sample S1 is greater than that of the negative compound material in the second sample S2.

The properties of the first, second, and third samples S1, S2, and S3 are described in Table 2 below.

TABLE 2

| Liquid Crystal<br>Properties | S1 | S2 | S3 |
|---|---|---|---|
| Tni | 70° C. | 80° C. | 80° C. |
| Δn (589 nm) | 0.0712 | 0.0801 | about 0.0820 |
| n1 | 1.5422 | 1.5523 | — |
| n2 | 1.4710 | 1.4722 | — |
| Δε | −2.7 | −2.4 | −2.4 |
| ε1 | 3.7 | 3.4 | 4.0 |
| ε2 | 6.4 | 5.8 | 6.4 |
| Δε/(Ave. ε) | −0.49 | −0.48 | −0.43 |
| Cell Gap | 3.95 μm | | 3.50 μm |

Referring to Table 2, the properties of the liquid crystal include a phase transition temperature Tni, diffractive indexes n1 and n2 and a diffractive anisotropy Δn against light having a wavelength of 589 nm, dielectric constants ε1 and ε2, a dielectric anisotropy Δε, an average dielectric constant Ave.ε, and a cell gap. In the liquid crystal properties, "n1" and "ε1" indicate a refractive index and a dielectric constant along a length direction of the liquid crystal, respectively. Similarly, "n2" and "ε2" indicate a refractive index and a dielectric constant along a width direction of the liquid crystal, respectively. The average dielectric constant "Ave.∈" can be calculated using the equation (2×∈2+∈1)/3. In addition, the cell gap indicates a distance between two substrates which correspond to the first and second substrates 100 and 200 of FIG. 6A and FIG. 6B.

As can be seen from Table 2, the first and third samples S1 and S3 exhibited relatively higher dielectric constants ∈1 and ∈2 than the second sample S2. Meanwhile, the third sample S3 exhibited a relatively lower dielectric anisotropy Δ∈ than the first sample S1.

Various capacitances of the LCD apparatuses employing the aforementioned liquid crystal samples S1, S2, and S3 are described in Table 3 below. In Table 3, "Cg" indicates a gate capacitance between the gate line 110 and the liquid crystal layer. Further, "Cd1" and "Cd2" indicate a first data capacitance between the first data line 120a and the liquid crystal layer and a second data capacitance between the second data line 120b and the liquid crystal layer, respectively. The capacitances Cg, Cd1, and Cd2 were measured using the LCD apparatus employing the samples S1, S2, and S3, and the LCD apparatuses were fabricated to have the structure shown in FIG. 5. In this case, the LCD apparatuses were operated at a frame frequency of 120 Hz.

TABLE 3

| Capacitance | S1 | S2 | S3 |
|---|---|---|---|
| Cg (farad) | $1.539 \times 10^{-13}$ (1.0) | $1.540 \times 10^{-13}$ (1.001) | $1.544 \times 10^{-13}$ (1.003) |
| Cd1 (farad) | $1.736 \times 10^{-13}$ (1.0) | $1.736 \times 10^{-13}$ (1.0) | $1.774 \times 10^{-13}$ (1.005) |
| Cd2 (farad) | $1.731 \times 10^{-13}$ (1.0) | $1.730 \times 10^{-13}$ (0.999) | $1.735 \times 10^{-13}$ (1.002) |

In Table 3, the numerals in parentheses indicate normalized capacitances when the capacitances of the sample S1 are used as reference values.

Referring to Table 3, the capacitances Cg, Cd1, and Cd2 of the first sample S1 were nearly the same as the corresponding capacitances Cg, Cd1, and Cd2 of the second sample S2 without any significant differences, respectively. Further, the capacitances Cg, Cd1, and Cd2 of the first sample S1 were also nearly the same as the corresponding capacitances Cg, Cd1, and Cd2 of the third sample S3 without any significant differences, respectively. If the gate capacitance Cg and the first and second data capacitances Cd1 and Cd2 increase, the loading capacitances of the gate line and the data lines are increased to delay the transmission speed of the electrical signals applied to the gate line and the data lines. However, the maximum differences between the normalized capacitance values of the first, second, and third samples S1, S2, and S3 were merely about 0.005. Accordingly, it can be understood that the electrical signals transmitted through the gate lines and the data lines may not be significantly delayed even if the storage electrodes are omitted from the LCD apparatus.

Various operation characteristics of the LCD apparatuses employing the liquid crystal samples S1, S2, and S3 are described in Table 4 below. The LCD apparatuses showing the measurement results described in Table 4 were fabricated to have the same structure as shown in FIG. 5, and the operation characteristics of Table 4 were measured with the LCD apparatuses operating at a frame frequency of 120 Hz. In Table 4, "Cst" indicates a storage capacitance, and "Clc" indicates a liquid crystal capacitance. Further, "Cgs" indicates a parasitic capacitance between a gate electrode and a source electrode of the thin film transistor. The kick back voltage "Vkb" was measured when the voltage difference ΔV12 (refer to the equations 2 and 3) was 30 Volts. The kick back voltage variation ΔVkb corresponds to a difference between the kick back voltage Vkb at a black color state and the kick back voltage Vkb at a white color state. In the exemplary embodiment shown in FIG. 5, storage electrodes are omitted. Thus, the storage capacitances described in Table 4 are zero.

TABLE 4

| Operation | S1 | | S2 | | S3 | |
|---|---|---|---|---|---|---|
| Characteristic | White | Black | White | Black | White | Black |
| Cst | 0 pF | | 0 pF | | 0 pF | |
| Clc | 0.377 pF | 0.218 pF | 0.377 pF | 0.221 pF | 0.377 pF | 0.236 pF |
| Cgs | 12.54 fF | | 12.54 fF | | 12.54 fF | |
| Vkb | 0.96575 | 1.63182 | 0.96575 | 1.61085 | 0.96575 | 1.51363 |
| ΔVkb | 0.66607 Volts | | 0.64510 Volts | | 0.54788 Volts | |

Referring to Table 4, the liquid crystal capacitances Clc of the first, second, and third samples S1, S2, and S3 at the white color state were equal to each other, whereas the liquid crystal capacitance Clc of the third sample S3 at the black color state is greater than the liquid crystal capacitances Clc of the first and second samples S1 and S2 at the black color state. In more detail, it is assumed that the liquid crystal capacitance Clc at the white color state and the liquid crystal capacitance Clc at the black color state correspond to a first liquid crystal capacitance and a second liquid crystal capacitance respectively, and a difference between the first and second liquid crystal capacitances corresponds to a liquid crystal capacitance difference. In this case, the liquid crystal capacitance difference of the third sample S3 is less than any other liquid crystal capacitance differences of the first and second samples S1 and S2. Thus, only the third sample S3 among the three different samples S1, S2, and S3 had a minimum voltage variation ΔVkb of about 0.55 Volts, as described in Table 4. As a result, when the liquid crystals of the third sample S3 are employed in the LCD apparatus, the kick back phenomenon may be significantly suppressed to improve the image quality of the LCD apparatus. In particular, the liquid crystals of the third sample S3 may be appropriately used in the LCD apparatus, which is fabricated to have the structure as shown in FIG. 5 and is operated at the frame frequency of 120 Hz, as can be seen from Tables 1, 2, 3, and 4.

Figure 7:
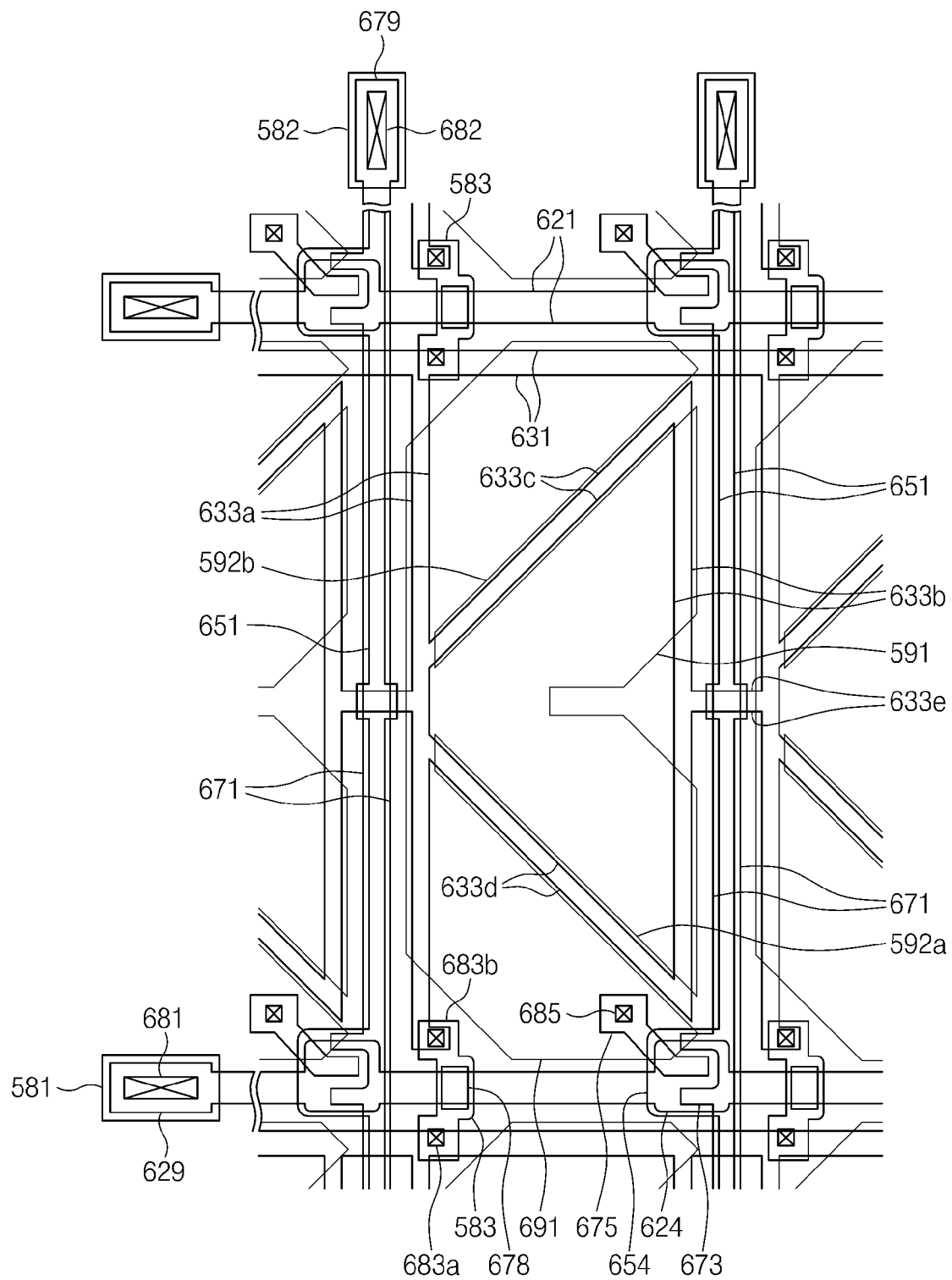
FIG. 7 is a plan view showing a liquid crystal display apparatus according to yet another exemplary embodiment of the present invention.
Figure 8:
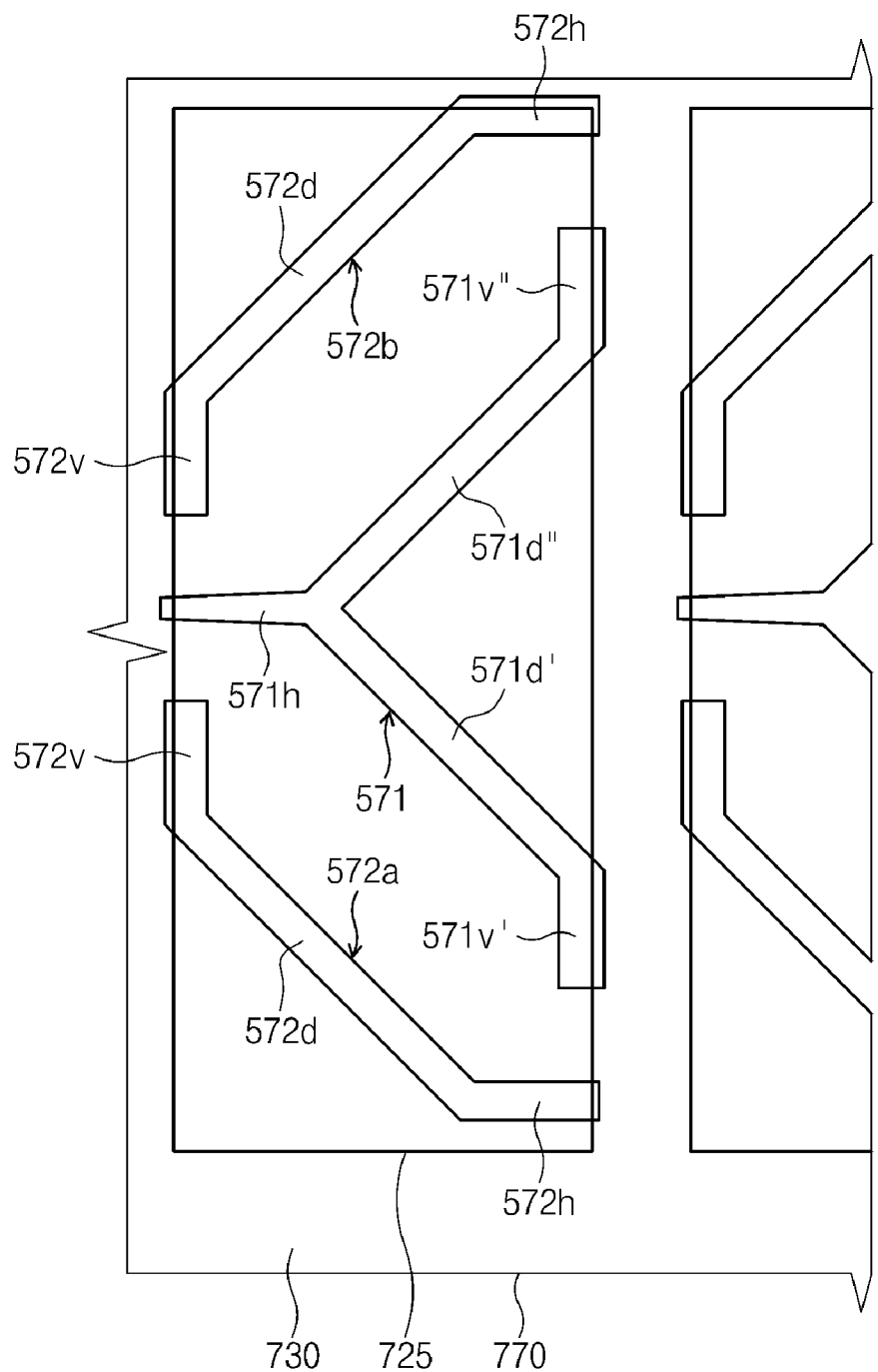
FIG. 8 is a plan view showing a common electrode panel used in a liquid crystal display apparatus according to yet still another exemplary embodiment of the present invention.
Figure 9:
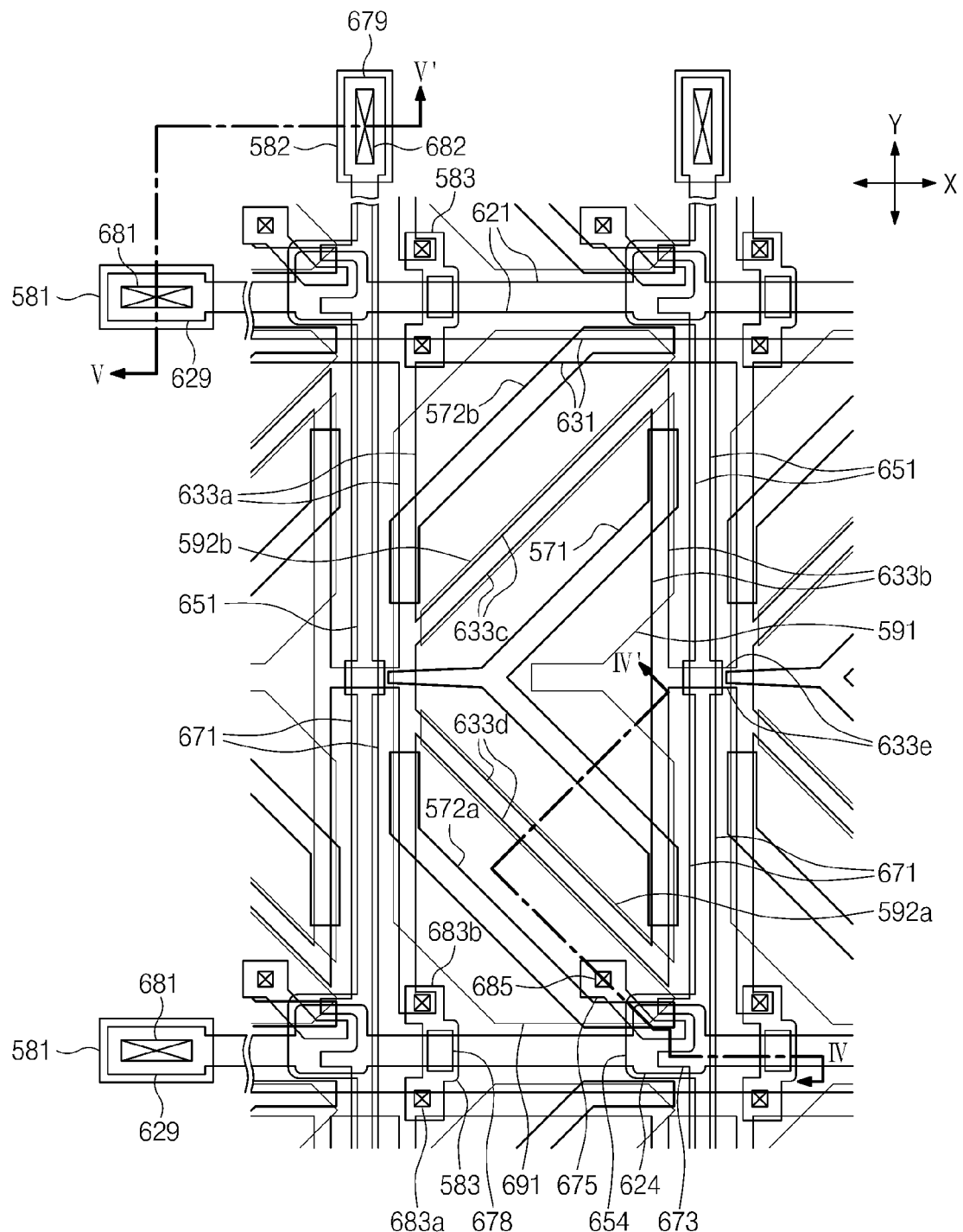
FIG. 9 is a plan view showing a liquid crystal display apparatus employing the thin film transistor panel of FIG. 7 and the common electrode panel of FIG. 8.
Figure 10:
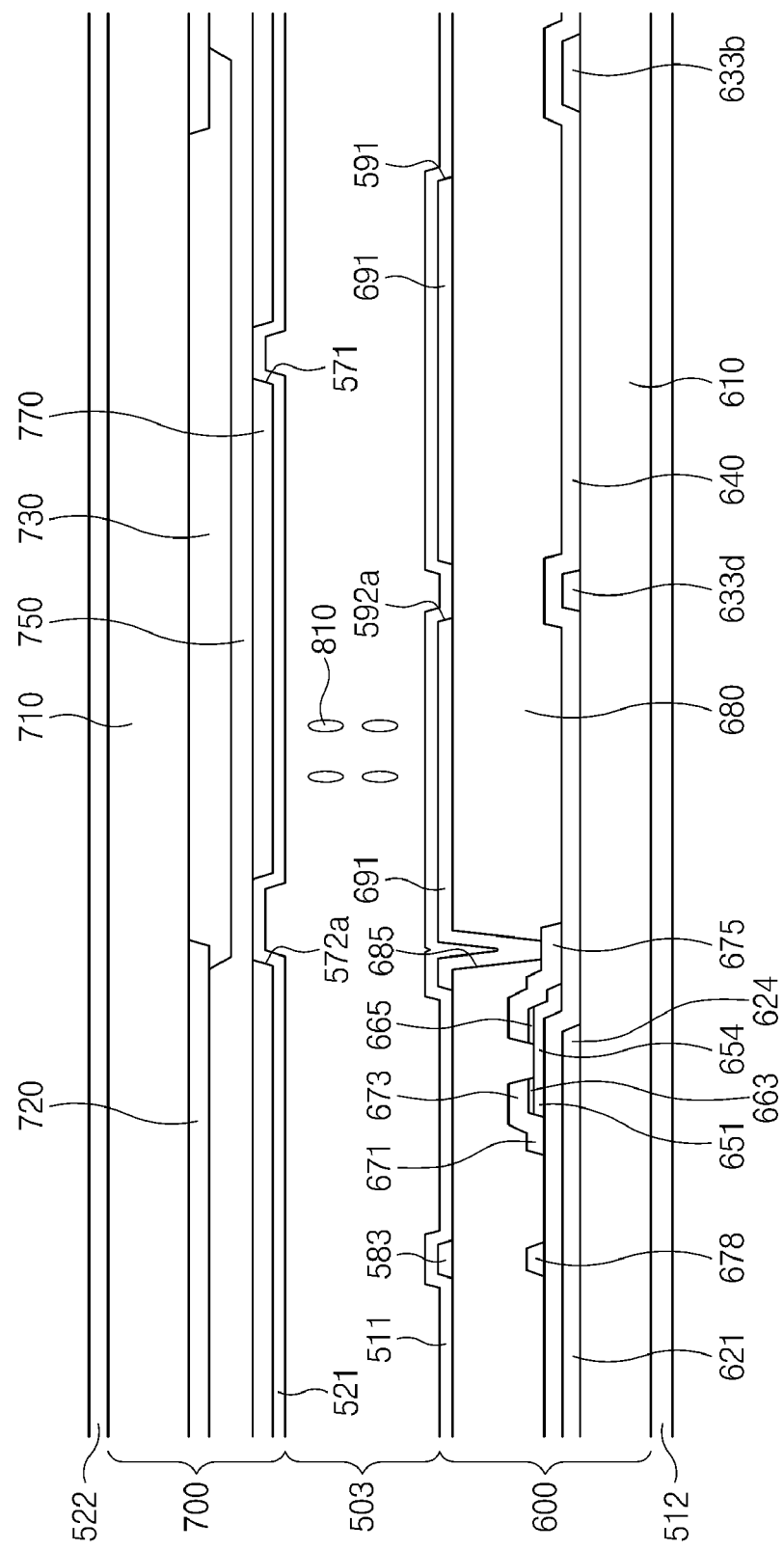
FIG. 10 is a cross sectional view taken along line IV-IV' of FIG. 9.
Figure 11:
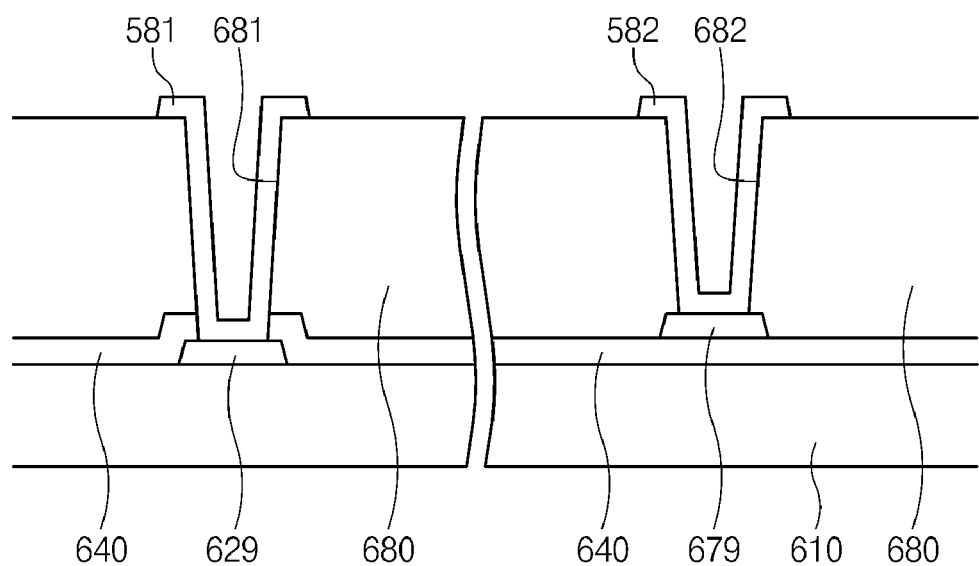
FIG. 11 is a cross sectional view taken along line V-V' of FIG. 9.

FIG. 7 is a plan view showing a liquid crystal display apparatus according to yet another exemplary embodiment of the present invention, and FIG. 8 is a plan view showing a common electrode panel used in liquid crystal display apparatus according to yet still another exemplary embodiment of the present invention. Further, FIG. 9 is a plan view showing a liquid crystal display apparatus employing the thin film transistor panel of FIG. 7 and the common electrode panel of FIG. 8. Moreover, FIG. 10 is a cross sectional view taken along line IV-IV' of FIG. 9, and FIG. 11 is a cross sectional view taken along line V-V' of FIG. 9.

Referring to FIG. 7, FIG. 8, FIG. 9, FIG. 10, and FIG. 11, the LCD apparatus according to the present exemplary embodiment may include a thin film transistor panel 600 and a common electrode panel 700, and a liquid crystal layer 503 disposed therebetween.

The liquid crystal layer 503 may include a plurality of liquid crystals 810, and each liquid crystal 810 may include various compounds having different physical properties. The liquid crystal 810 may have a core group acting as a central axis and at least one of a terminal group and a lateral group connected to the core group.

The core group may include at least one cyclic compound of a phenyl group, a cyclohexyl group, and a heterocyclic compound. Each of the terminal group and the lateral group may include at least one of a non-polar group and a polar group. The non-polar group may correspond to an alkyl group, an alkoxy group, or an alkenyl group, and the polar group may correspond to a fluorine atom. Physical properties of the liquid crystal 810 may be determined by the terminal group and/or the lateral group.

The liquid crystal 810 may include a neutral compound material that does not have dielectric anisotropy and a polar compound material that has dielectric anisotropy.

The neutral compound material does not have dielectric anisotropy but has a diffractive anisotropy. The neutral compound material may serve to appropriately maintain the viscosity of the liquid crystal 810. The neutral compound material may include at least one compound expressed by one of the following chemical formulas I, II, and III.

(I)

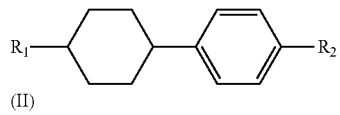

Chemical Formula I (II)

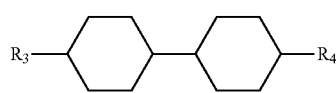

Chemical Formula II (III)

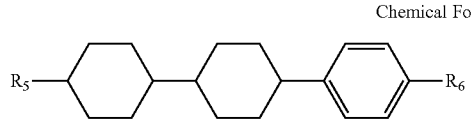

Chemical Formula III wherein, each of "$R_1$", "$R_2$", "$R_3$", "$R_4$", "$R_5$" and "$R_6$" may include one of an alkyl group and an alkoxy group, which have one, two, three, four, five, six, seven, eight, nine, or ten carbon molecules.

The liquid crystal 810 may include about 10 wt % to about 25 wt % of the neutral compound material. The remainder of the liquid crystal 810 may include a polar compound material to be subsequently described. When the content of the neutral compound material is within the range of about 10 wt % to about 25 wt %, the liquid crystal 810 may have an appropriate viscosity.

The polar compound material may have dielectric anisotropy $\Delta\in$ and diffractive anisotropy $\Delta n$, and the polar compound material may include a lateral group having at least one fluorine atom.

The dielectric anisotropy $\Delta\in$ may correspond to a difference between a horizontal dielectric constant $\in|$ ($\in1$ of Table 2) along a direction parallel to a length direction of the liquid crystal 810 and a vertical dielectric constant $\in\perp$ ($\in2$ of Table 2) along a direction perpendicular to the length direction of the liquid crystal 810. When the horizontal dielectric constant $\in|$ is greater than the vertical dielectric constant $\in\perp$, the liquid crystal 810 may have positive dielectric anisotropy. Alternatively, when the horizontal dielectric constant $\in|$ is less than the vertical dielectric constant $\in\perp$, the liquid crystal 810 may have negative dielectric anisotropy.

When an electric field is applied to the liquid crystal 810 having positive dielectric anisotropy, the liquid crystal 810 may be arranged parallel to the electric field. On the other hand, when an electric field is applied to the liquid crystal 810 having negative dielectric anisotropy, the liquid crystal 810 may be arranged perpendicular to the electric field. Accordingly, the liquid crystals 810 having positive dielectric anisotropy may be used in a horizontal alignment type LCD apparatus, and the liquid crystals 810 having negative dielectric anisotropy may be used in a vertical alignment type LCD apparatus.

The liquid crystals 810 according to the present exemplary embodiments may be applied to the vertical alignment type LCD apparatus and may include both the compound material having positive dielectric anisotropy (e.g., a positive compound material) and the compound material having negative dielectric anisotropy (e.g., a negative compound material).

The positive compound material may include at least one compound expressed by one of the following chemical formulas IV, V, VI, VII, and VIII.

(IV)

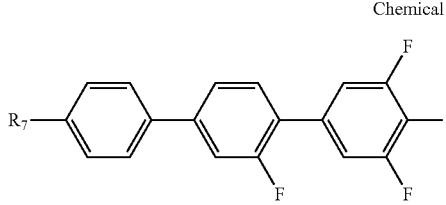

Chemical Formula IV (V)

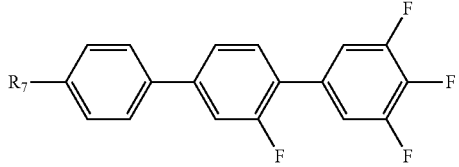

Chemical Formula V (VI)

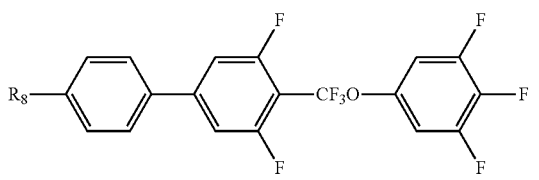

Chemical Formula VI (VII)

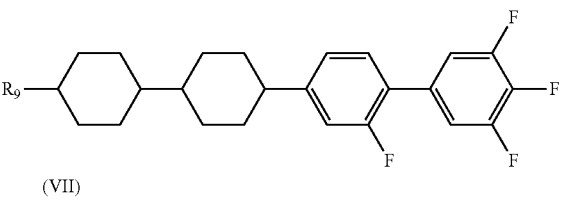

-continued

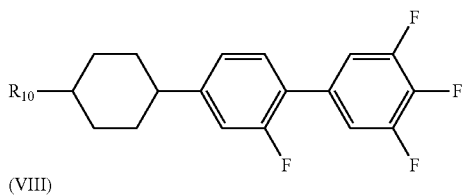

Chemical Formula VII (VIII)

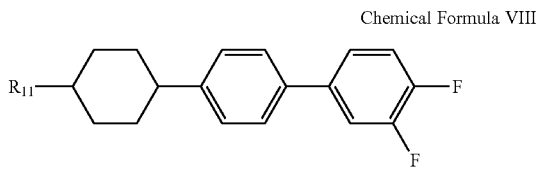

Chemical Formula VIII wherein, each of "$R_7$", "$R_8$", "$R_9$", "$R_{10}$" and "$R_{11}$" may include one of an alkyl group and an alkoxy group, which have one, two, three, four, five, six, seven, eight, nine, or ten carbon molecules.

The liquid crystal 810 may include the positive compound material at a content of about 2 wt % to about 15 wt %.

The negative compound material may include at least one compound expressed by one of the following chemical formulas IX, X, XI, and XII.

(IX)

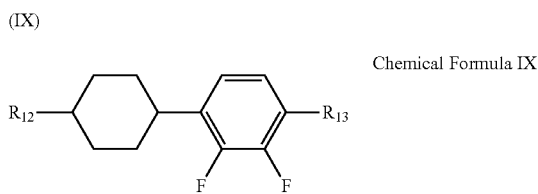

Chemical Formula IX (X)

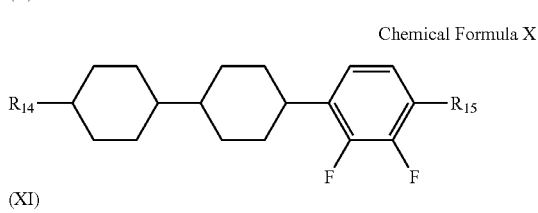

Chemical Formula X (XI)

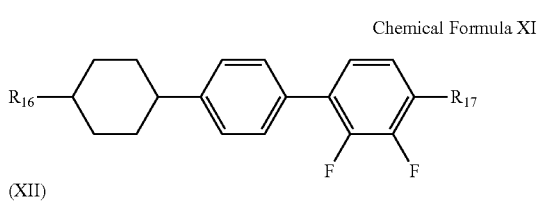

Chemical Formula XI (XII)

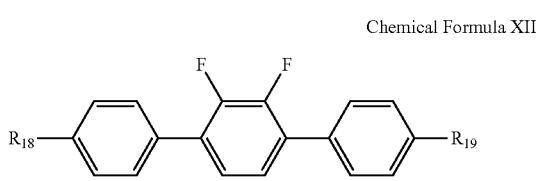

Chemical Formula XII wherein, each of "$R_{12}$", "$R_{13}$", "$R_{14}$", "$R_{15}$", "$R_{16}$", "$R_{17}$", "$R_{18}$", and "$R_{19}$" may include one of an alkyl group and an alkoxy group, which have one, two, three, four, five, six, seven, eight, nine, or ten carbon molecules.

The liquid crystal 810 may include about 60 wt % to about 80 wt % of the negative compound material.

The dielectric anisotropy $\Delta\varepsilon$ of the aforementioned liquid crystals 810 may have a negative value since the liquid crystals 810 are applicable to a vertical alignment type LCD apparatus.

As described above, the liquid crystal 810 may include about 60 wt % to about 80 wt % of the negative compound material. Thus, the vertical dielectric constant $\varepsilon\perp$ of the liquid crystal 810 may increase since the negative compound material content is over 60 wt %. In an exemplary embodiment, the liquid crystal 810 may have the vertical dielectric constant $\varepsilon\perp$ of about 6.7 or higher. In contrast, when the negative compound material content is over 80 wt %, the reliability of the liquid crystal 810 may be degraded and the viscosity of the liquid crystal 810 may be increased. Therefore, the neutral compound material content should be relatively decreased when the negative compound material content increases.

Notwithstanding that the liquid crystal 810 is used in a vertical alignment type LCD apparatus, the liquid crystal 810 may include a low content of about 2 wt % to about 15 wt % of the positive compound material. If the positive compound material content exceeds 2 wt %, the horizontal dielectric constant $\varepsilon|$ of the liquid crystal 810 may also increase. Further, if the positive compound material content exceeds 15 wt %, the movement of the liquid crystal 810 may become more dulled. In this case, it may be necessary to increase the operating voltage of the LCD apparatus.

The liquid crystal 810 may have both the horizontal dielectric constant $\varepsilon|$ and the vertical dielectric constant $\varepsilon\perp$. Thus, a total dielectric constant of the liquid crystal layer 503 including the plurality of liquid crystals 810 may increase, and the liquid crystal capacitances (e.g., Clc1 and Clc2 of the equations 2 and 3) may also increase. This may lead to an increase in the data voltage holding time. Accordingly, there may be no need to form an auxiliary capacitor to increase the liquid crystal capacitances in the pixel areas PA. As a result, the aperture ratio of the LCD apparatus may be increased without any degradation of an integrated density. In addition, if the liquid crystal capacitances increase, the kick back voltage may decrease, which may prevent a display error such as a flicker.

If the liquid crystal 810 includes the positive compound material, the dielectric anisotropy $\Delta\varepsilon$ of the liquid crystal 810 may be lowered to have a negative value within a range of about −2.6 to −3.4. That is, a ratio ($\Delta\varepsilon/\varepsilon\perp$) of the dielectric anisotropy $\Delta\varepsilon$ to the vertical dielectric constant $\varepsilon\perp$ may be significantly lowered to have a value within a range of about 0.31 to 0.46. The liquid crystal 810 may have a phase transition temperature Tni of about 70° C. to 95° C. and a diffractive anisotropy $\Delta n$ of about 0.103 or the less.

Now, descriptions to the thin film transistor panel 600 will be developed with reference to FIG. 7, FIG. 8, FIG. 9, FIG. 10, and FIG. 11 in connection with the LCD apparatus employing the above-described liquid crystals 810.

Referring to FIG. 7, FIG. 8, FIG. 9, FIG. 10, and FIG. 11, a plurality of gate lines 621 and a plurality of storage lines 631 may be disposed on an insulator substrate 610, which may include transparent glass or transparent plastic material. The gate lines 621 may be disposed in a row direction to be parallel (e.g., parallel to an x-axis) as shown in FIG. 7 and FIG. 9. Each gate line 621 may include a plurality of gate electrodes 624 that are located in some portions of the gate line 621 and a gate pad 629 that is located at an end of the gate line 621. The gate electrodes 624 may have a width that is greater than that of the gate line 621. Similarly, the gate pad 629 may also have a width that is greater than that of the gate line 621. The gate pad 629 may act as a contact pad to connect the gate line 621 with another conductive line or an external circuit.

Each storage line 631 may include a main storage line that is disposed parallel to the gate line 621 adjacent thereto, a plurality of storage electrode groups that are split from the main storage line, and a plurality of connections 633e that connect the adjacent storage electrode groups. Each storage electrode group may include a plurality of storage electrodes, for example, first, second, third, and fourth storage electrodes 633a, 633b, 633c, and 633d, which are directly or indirectly connected to the main storage line.

The first storage electrodes 633a may extend from the main storage line in a column direction to be parallel (e.g., parallel to a y-axis) as shown in FIG. 7 and FIG. 9. The second storage electrodes 633b may be disposed parallel to the first storage electrodes 633a. Each first storage electrode 633a may include a fixed portion directly connected to the main storage line and a free portion serially connected to the fixed portion. The third and fourth storage electrodes 633c and 633d may be disposed between the first and second storage electrodes 633a and 633b. The third storage electrode 633c may connect a central portion of the first storage electrode 633a (e.g., a portion between the fixed portion and the free portion) to one end of the second storage electrode 633b, and the fourth storage electrode 633d may connect the central portion of the first storage electrode 633a to the other end of the second storage electrode 633b. The storage electrode groups may be disposed in a plurality of pixel areas, respectively. The second storage electrode 633b in a specific pixel area may be connected to the first storage electrode 633a in another pixel area that is adjacent to the specific pixel area along the row direction, by one of the connections 633e. The configuration and location of each storage line 631 (including the storage electrodes 633a, 633b, 633c, and 633d) may be embodied in many different forms and should not be construed as limited to the exemplary embodiments set forth herein. If the liquid crystal layer 503 produces a sufficient liquid crystal capacitance to prevent the kick back phenomenon without the storage electrodes 633a, 633b, 633c, and 633d, the storage lines 631 including the storage electrodes 633a, 633b, 633c, and 633d may be omitted.

The gate lines 621 and the storage lines 631 may include a metal layer having low electrical resistance. For example, the gate lines 621 and the storage lines 631 may include a metal layer containing aluminum (Al), a metal layer containing silver (Ag), a metal layer containing copper (Cu), a metal layer containing molybdenum (Mo), a chrome layer, a tantalum layer, or a titanium layer. In another exemplary embodiment, the gate lines 621 and the storage lines 631 may include a multi-level conductive layer including at least two conductive layers having different physical properties from each other.

The gate lines 621 and the storage lines 631 (including the storage electrodes 633a, 633b, 633c, and 633d) may include positive sloped sidewalls having an inclination of about 30 degrees to 80 degrees with respect to a main surface of the substrate 610. When a sidewall of a line is referred to as being positively sloped, it will be understood that a top width of the line is less than a bottom width thereof.

A gate insulating layer 640 may be disposed to cover the gate lines 621, the storage lines 631, and the substrate 610. The gate insulating layer 640 may include an insulating layer, such as a silicon nitride layer or a silicon oxide layer. A plurality of line-shaped semiconductor patterns 651 may be disposed on the gate insulating layer 640, and the line-shaped semiconductor patterns 651 may include a hydrogenated amorphous silicon (a-Si:H) layer or a polysilicon layer. Each line-shaped semiconductor pattern 651 may be disposed to cross over the gate lines 621 and may have extensions 654 that overlap the gate electrodes 624.

A plurality of line-shaped ohmic contact members (not shown) may be disposed across the semiconductor patterns 651 respectively, and a plurality of island-shaped ohmic contact members 665 may be disposed on the semiconductor patterns 651 respectively. Each line-shaped ohmic contact member may include a protrusion 663 that overlaps a portion of the semiconductor extension 654. The protrusion 663 of the line-shaped ohmic contact member and the island-shaped ohmic contact member 665 may be disposed on both ends of the extension 654, respectively. The protrusions 663 and the island-shaped ohmic contact members 665 may act as source-side ohmic contact members and drain-side ohmic contact members, respectively. The ohmic contact members 663 and 665 may include an amorphous silicon layer heavily doped with n-type impurities, such as phosphorous ions or a metal silicide layer.

The semiconductor patterns 651 and the ohmic contact members 663 and 665 may also include positive sloped sidewalls having an inclination of about 30 degrees to about 80 degrees with respect to the main surface of the substrate 610. A plurality of data lines 671, a plurality of drain electrodes 675, and a plurality of isolated conductive patterns 678 may be disposed on the ohmic contact members 663, the ohmic contact members 665, and the gate insulating layer 640, respectively.

The data lines 671 may act as transmission lines for data signals and may extend to cross over the gate lines 621, the main storage lines of the storage lines 631, and the connections 633e. Each data line 671 may include a plurality of source electrodes 673 that respectively overlap the ohmic contact members 663 arrayed along a column direction. In addition, each data line 671 may further include a data line pad 679 connected to an end thereof. The data line pad 679 may act as a contact pad to connect the data line 671 with another conductive line or an external circuit.

The drain electrodes 675 may be spaced apart from the source electrodes 673, and the drain electrodes 675 and the source electrodes 673 may be disposed on a single semiconductor extension 654 of the semiconductor pattern 651 to face each other. Each drain electrode 675 may include a drain pad extending from one end thereof, and the other end of the drain electrode 675 may be surrounded by the source electrode 673, as shown in FIG. 7, FIG. 8, and FIG. 9. The single semiconductor extension 654, the gate electrode 624 overlapping the single semiconductor extension 654, and the single source and drain electrodes 673 and 675 overlapping the single semiconductor extension 654 may constitute a thin film transistor. The semiconductor extension 654 between the source and drain electrodes 673 and 675 may act as a channel region of the thin film transistor.

The isolated conductive patterns 678 may be disposed adjacent to ends of the first storage electrodes 633a, respectively. The data lines 671, the drain electrodes 675, and the isolated metal patterns 678 may include a conductive layer having a low electric resistance, for example, a metal silicide layer.

The data lines 671 (including the source electrodes 673), the drain electrodes 675, and the isolated conductive patterns 678 may also include positive sloped sidewalls having an inclination of about 30 degrees to 80 degrees with respect to the main surface of the substrate 610. The line-shaped ohmic contact members including the source-side ohmic contact members 663 may be disposed between the line-shaped semiconductor patterns 651 and the data lines 671 stacked on the line-shaped semiconductor patterns 651, thereby reducing contact resistances therebetween. Similarly, the island-shaped ohmic contact members 665 may be disposed between the line-shaped semiconductor patterns 651 and the drain electrodes 675 stacked on the line-shaped semiconductor patterns 651, thereby reducing contact resistances therebetween.

The data lines 671, the drain electrodes 675, the isolated conductive patterns 678, and the semiconductor patterns 651 may be covered with a passivation layer 680. A plurality of pixel electrodes 691, a plurality of overpasses 583, and a plurality of contact assistants 581 and 582 may be disposed on the passivation layer 680. The pixel electrodes 691, the overpasses 583, and the contact assistants 581 and 582 may include a transparent conductive layer or a reflective metal layer. The transparent conductive layer may include an indium tin oxide (ITO) layer or an indium zinc oxide (IZO) layer, and the reflective metal layer may include an aluminum layer, a silver layer, a chrome layer, or an alloy layer of aluminum, silver, or chrome.

Each respective pixel electrode 691 may be directly connected to the corresponding drain electrode 675 through one of contact holes 685, which penetrate the passivation layer 680. Thus, when a data voltage is applied to any one data line 671 selected from the data lines 671 and one of the thin film transistors connected to the selected data line 671 is selectively turned on, the data voltage may be applied to the pixel electrode 691 connected to the selected thin film transistor through the drain electrode 675 of the selected thin film transistor. In this case, if a common voltage is applied to a common electrode 770 disposed on the common electrode panel 700 facing the insulating substrate 610, an electric field may be generated between the common electrode 770 and the pixel electrode 691 to which the data voltage is applied. The electric field between the common electrode 770 and the pixel electrode 691 may influence the alignment of the liquid crystals 810 between the common electrode 770 and the pixel electrode 691, and polarization of light penetrating the liquid crystals 810 may depend on the alignment direction of the liquid crystals 810.

A pixel electrode 691 and the common electrode 770 may constitute a liquid crystal capacitor. Thus, even after the thin film transistor is turned off, the data voltage applied to the pixel electrode 691 may be maintained for awhile. Further, the pixel electrode 691 may overlap the storage line 631 including the storage electrodes 633a, 633, 633c, and 633d. Thus, the pixel electrode 691 and the storage line 631 may constitute a storage capacitor. The storage capacitor and the liquid crystal capacitor may be connected in parallel. Accordingly, the storage capacitor may increase a data voltage holding time of the liquid crystal capacitor. In other words, the storage capacitor may improve a data retention characteristic of the pixel.

Each pixel electrode 691 may have a rectangular-shaped configuration including four main sides and four chamfered corners when viewed from a plan view. First and second main sides of the pixel electrode 691 may face each other and are parallel to the data lines 671, and third and fourth main sides of the pixel electrode 691 may face each other and are parallel to the gate lines 621. Each chamfered corner of the pixel electrode 691 may include an oblique side having an inclination of about 45 degrees with respect to the gate lines 621. Further, the pixel electrode 691 may be divided into a plurality of partitions by a first cutting region 592a, a second cutting region 592b, and a central cutting region 591, which penetrate the pixel electrode 691. In addition, a horizontal straight line, which passes through a central point of the pixel electrode 691 and is parallel to the gate lines 621, may divide the pixel electrode 691 into a first half region and a second half region. The first half region of the pixel electrode 691 may be symmetrical to a second half region thereof with respect to the horizontal straight line.

The first cutting region 592a may extend from a right bottom corner of the pixel electrode 691 toward a central point of the left side thereof, and the second cutting region 592b may extend from a right top corner of the pixel electrode 691 toward the central point of the left side thereof. That is, the first and second cutting regions 592a and 592b may have a line-shaped configuration. In an exemplary embodiment, the first and second cutting regions 592a and 592b may overlap the fourth storage electrode 633d and the third storage electrode 633c, respectively. Therefore, the first and second cutting regions 592a and 592b may be disposed in the first and second half regions of the pixel electrode 691, respectively. An angle between the first and second cutting regions 592a and 592b may be about 90 degrees, and extension lines of the first and second cutting regions 592a and 592b may meet the gate lines at an angle of about 45 degrees.

The central cutting region 591 may extend from a central region of the right side toward a central region of the left side along the horizontal straight line. An inlet portion of the central cutting region 591 may have a pair of oblique sides that are parallel to the first and second cutting regions 592a and 592b respectively. As a result, the first cutting region 592a may divide the first half region of the pixel electrode 691 into two separate regions, and the second cutting region 592b may divide the second half region of the pixel electrode 691 into two separate regions. The pixel electrode 691 may be embodied in many different forms and should not be construed as limited to the exemplary embodiments set forth herein. For example, the number of the cutting regions 591, 592a, and 592b and the dimension of the pixel electrode 691 may be changed according to properties of the liquid crystal layer 503 and a design scheme of the LCD apparatus.

The overpasses 583 may cross over the gate lines 621. One end of each overpass 583 may be connected to one of the storage lines 631 through a contact hole 683a that penetrates the passivation layer 680 and the gate insulating layer 640, and the other end of each of the overpasses 583 may be connected to one of the first storage electrodes 633a through a contact hole 683b that penetrates the passivation layer 680 and the gate insulating layer 640. The storage lines 631 including the storage electrodes 633a and 633b may be used to repair the gate lines 621, the data lines 671, or the thin film transistors that have defects.

Each contact assistant 581 may be connected to one of the gate pads 629 through one of contact holes 681 that penetrate the passivation layer 680. Similarly, each contact assistant 582 may be connected to one of the data line pads 679 through one of contact holes 682 that penetrate the passivation layer 680 and the gate insulating layer 640. The contact assistants 581 may improve the adhesion between the gate pads 629 and other conductive lines to be connected thereto, and the contact assistants 582 may improve the adhesion between the data line pads 679 and other conductive lines to be connected thereto. Further, the contact assistants 581 and 582 may protect the gate pads 629 and the data line pads 679.

Now, descriptions to the common electrode panel 700 will be developed with reference to FIG. 8, FIG. 9, and FIG. 10 in more detail.

Referring again to FIG. 8, FIG. 9, and FIG. 10, an optical blocking layer 720 may be disposed on an insulating substrate 710, which may include transparent glass or transparent plastic material. The optical blocking layer 720 may be referred to as a black matrix. The optical blocking layer 720 may block light that passes through gap regions between the pixel electrodes 691. That is, the optical blocking layer 720 may have a plurality of openings 725 that face the pixel electrodes 691, respectively. As a result, each opening 725 may have almost the same configuration as the corresponding pixel electrode 691. In addition, the optical blocking layer may include a first portion that faces the gate lines 621 and the data lines 671 and a second portion that faces the thin film transistors.

A plurality of color filters 730 may be disposed on the openings 725, respectively. In another exemplary embodiment, the color filters 730 located in each column of the pixel areas may extend along the y-axis (refer to FIG. 9). In this case, the color filters 730 in each column may be connected to each other, thereby providing a single color filter line. Each color filter 730 may be one of a red color filter, a green color filter, and a blue color filter.

The color filters 730 and the optical blocking layer 720 may be covered with an overcoat layer 750. The overcoat layer 750 may include an organic insulating layer. The overcoat layer 750 may prevent the color filters 730 from being exposed and may have a flat surface. In other exemplary embodiments, the overcoat layer 750 may be omitted.

A common electrode 770 may be disposed on the overcoat layer 750. When the overcoat layer 750 is not provided, the common electrode 770 may be directly disposed on the optical blocking layer 720 and the color filters 730. The common electrode 770 may include a transparent conductive layer such as an indium tin oxide (ITO) layer or an indium zinc oxide (IZO) layer. A plurality of cutting region groups may be provided to penetrate the common electrode 770. Each cutting region group may include a plurality of cutting regions. For example, each cutting region group may include a first cutting region 572a, a second cutting region 572b, and a central cutting region 571.

The cutting regions 571, 572a, and 572b may be disposed not to overlap the cutting regions 591, 592a, and 592b of the pixel electrode 691. For example, the first cutting region 572a may be disposed between the first cutting region 592a of the pixel electrode 691 and the chamfered oblique side of the left bottom corner of the pixel electrode 691, as shown in FIG. 9. Similarly, the second cutting region 572b may be disposed between the second cutting region 592b of the pixel electrode 691 and the chamfered oblique side of the left top corner of the pixel electrode 691, as shown in FIG. 9. Further, the central cutting region 571 may be disposed between the first and second cutting regions 592a and 592b and the central cutting region 591 of the pixel electrode 691, as shown in FIG. 9. Each cutting region 571, 572a, and 572b may include at least one diagonal portion that is parallel to the first cutting region 592a or the second cutting region 592b of the pixel electrode 691. Each cutting region group (including the first cutting region 572a, the second cutting region 572b, and the central cutting region 571) may have a line symmetry configuration. In this case, the horizontal straight line of the pixel electrode 691 may act as an axis of symmetry.

Each of the first and second cutting regions 572a and 572b may include a diagonal portion 572d, a vertical portion 572v parallel to the y-axis, and a horizontal portion 572h parallel to the x-axis, as shown in FIG. 8 and FIG. 9. The horizontal portion 572h may extend from one end of the diagonal portion 572d, and the vertical portion 572v may extend from the other end of the diagonal portion 572d.

The central cutting region 571 may include a central horizontal portion 571h, first and second diagonal portions 571d' and 571d", and first and second vertical portions 571v' and 571v". The central horizontal portion 571h may be disposed to extend from a central point of the left side of the pixel electrode 691 toward the right side of the pixel electrode 691 when viewed from the plan views of FIG. 8 and FIG. 9. The first diagonal portion 571d' may extend from a right end of the central horizontal portion 571h to be parallel to the diagonal portion 572d of the first cutting region 572a, and the second diagonal portion 571d" may extend from the right end of the central horizontal portion 571h to be parallel to the diagonal portion 572d of the second cutting region 572b. In addition, the first vertical portion 571v' of the central cutting region 571 may extend from a right end of the first diagonal portion 571d' to be parallel to the y-axis, and second vertical portion 571v" of the central cutting region 571 may extend from the right end of the second diagonal portion 571d" to be parallel to the y-axis.

The cutting regions 571, 572a, and 572b penetrating the common electrode 770 may be embodied in many different forms and should not be construed as limited to the exemplary embodiments set forth herein. For example, the number and the configuration of the cutting regions 571, 572a, and 572b may be changed according to properties of the liquid crystal layer 503 and a design scheme of the LCD apparatus. The optical blocking layer 720 may further include a plurality of optical blocking patterns disposed to overlap the cutting regions 571, 572a, and 572b. The optical blocking patterns may block light that passes through the cutting regions 571, 572a, and 572b.

When a common voltage is applied to the common electrode 770 and a data voltage is applied to the pixel electrode 691, an electric field may be generated between the common electrode 770 and the pixel electrode 691. A direction of the electric field may be substantially perpendicular to the electrodes 691 and 770. If the liquid crystals 810 have negative dielectric anisotropy, the liquid crystals 810 between the electrodes 691 and 770 may be arranged perpendicular to the electric field. The electric field may be distributed such that it is not perpendicular to the electrodes 691 and 770. This is due to the presence of the common electrode cutting regions 571, 572a, and 572b, and the pixel electrode cutting regions 591, 592a, and 592b, which do not overlap with each other, as described with reference to FIG. 4B. As a result, the liquid crystals 810 between the electrodes 691 and 770 may be arranged tilted when the common voltage and the data electrode are applied to the common electrode 770 and the pixel electrode 691, respectively.

Referring again to FIG. 9, the cutting regions 571, 572a, and 572b and 591, 592a, and 592b may divide the liquid crystal layer 503 in a single pixel area into a plurality of sub-pixel areas. Each sub-pixel area may include a pair of primary sides that intersect the x-axis at an angle of about 45 degrees. The primary sides of each sub-pixel area may intersect a polarization axis of polarizing plates (refer to reference numerals "512" and "522" of FIG. 10) at an angle of about 45 degrees. Thus, the light efficiency of the LCD apparatus may be maximized.

Most the liquid crystals 810 in each sub-pixel area may be tilted in a direction substantially perpendicular to the primary sides of each sub-pixel area. Thus, the liquid crystals 810 in each pixel area may include four groups of liquid crystals 810, which are arranged along four different directions respectively. If the number of alignment directions of the liquid crystals 810 increase, a viewing angle of the LCD apparatus may be improved.

The cutting regions 571, 572a, and 572b and 591, 592a, and 592b may be embodied in many different forms and should not be construed as limited to the exemplary embodiments set forth herein. For example, at least one of the cutting regions 571, 572a, and 572b and 591, 592a, and 592b may be replaced with a protrusion (refer to reference number "240" of FIG. 4A and FIG. 4B) or a recession. The protrusion may include an organic material layer or an inorganic material layer and may be disposed on or under the electrodes 691 and 770.

A first alignment layer 511 may be disposed to cover the passivation layer 680, the pixel electrodes 691, and the overpasses 583, and a second alignment layer 521 may be disposed to cover the common electrode 770. The first and second alignment layers 511 and 521 may correspond to a vertical alignment layer. The liquid crystal layer 503 may be disposed between the first and second alignment layers 511 and 521.

In yet still another exemplary embodiment, the LCD apparatus may further include a phase retardation layer to compensate a phase delay of the liquid crystal layer 503.

The liquid crystal layer 503 may have negative dielectric anisotropy as described above, and the liquid crystals 810 in the liquid crystal layer 503 may be arranged perpendicular to the electrodes 691 and 770 without any electric field. In this case, the polarizing layers 512 and 522 may block incident light irradiating onto the bottom surface of the substrate 610. In other words, the incident light may not pass through the polarizing layers 512 and 522.

As described above, the liquid crystal layer 503 may include a plurality of liquid crystals 810, and each liquid crystal 810 may contain a positive compound material, a negative compound material, and a neutral compound layer. A neutral compound content of the liquid crystal 810 may be within a range of about 10 wt % to 25 wt %, a positive compound content of the liquid crystal 810 may be within a range of about 2 wt % to 15 wt %, and a negative compound content of the liquid crystal 810 may be within a range of about 60 wt % to 80 wt %.

As described above, the liquid crystal 810 may have the dielectric anisotropy $\Delta\in$ of about −2.6 to −3.4, and a ratio ($\Delta\in/\in\perp$) of the dielectric anisotropy $\Delta\in$ to the vertical dielectric constant $\in\perp$ may be within a range of about 0.31 to 0.46. Further, the liquid crystal 810 may have a phase transition temperature Tni of about 70° C. to 95° C. and a diffractive anisotropy $\Delta n$ of about 0.103 or the less.

According to the exemplary embodiments describe above, the liquid crystal 810 may include both the positive compound material and the negative compound material, thereby increasing a total dielectric constant of the liquid crystal layer 503 including the plurality of liquid crystals 810. Thus, the liquid crystal capacitances may also increase. This may lead to an increase in the data voltage holding time of the LCD apparatus. Accordingly, there may be no need to form an auxiliary capacitor to increase the liquid crystal capacitances in the pixel areas PA. As a result, the aperture ratio of the LCD apparatus may be increased without any degradation of the integrated density.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display apparatus, comprising:

a first substrate having a pixel area;

a gate line disposed on the first substrate;

a data line disposed across the gate line to define the pixel area at a crossing of the gate line and the data line;

a pixel electrode to receive a data voltage corresponding to an image of the pixel area, the pixel electrode being disposed in the pixel area;

a second substrate facing the first substrate;

a common electrode to receive a common voltage, the common electrode being disposed on the second substrate; and a plurality of liquid crystals disposed between the first substrate and the second substrate, wherein each liquid crystal comprises about 60 wt % to about 80 wt % of a first compound material having a dielectric anisotropy of a first polarity, about 2 wt % to about 15 wt % of a second compound material having a dielectric anisotropy of a second polarity, and a neutral compound material, wherein the pixel electrode overlaps at least one of the gate line and the data line.

2. The apparatus of claim 1, wherein a content of the second compound material is about 2 wt % to about 7 wt %.

3. The apparatus of claim 2, wherein the neutral compound material comprises a compound expressed by the following chemical formula 1, and wherein the first compound material comprises at least one compound expressed by one of the following chemical formulas 2, 3, and 4

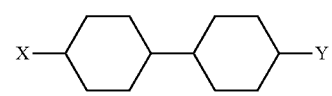

Chemical Formula 1 wherein, "X" denotes a hydrocarbon having 2, 3, 4, or 5 carbon molecules, and "Y" denotes an alkenyl group

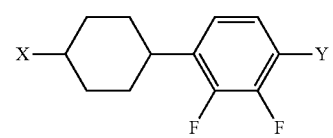

Chemical Formula 2 wherein, "X" denotes a hydrocarbon having 2, 3, 4, or 5 carbon molecules, and "Y" denotes an alkoxy group

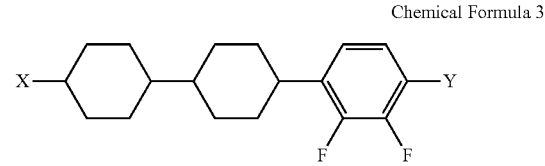

Chemical Formula 3 wherein, "X" denotes a hydrocarbon having 2, 3, 4, or 5 carbon molecules, and "Y" denotes an alkoxy group Chemical Formula 4

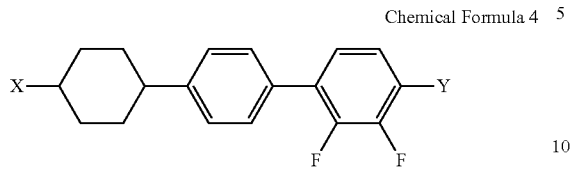

wherein, "X" denotes a hydrocarbon having 2, 3, 4, or 5 carbon molecules, and "Y" denotes an alkoxy group.

4. The apparatus of claim 3, wherein a content of the compound expressed by chemical formula 1 is about 25 wt % to about 35 wt %, wherein a content of the compound expressed by chemical formula 2 is about 15 wt % to about 20 wt %, wherein a content of the compound expressed by chemical formula 3 is about 20 wt % to about 30 wt %, and wherein a content of the compound expressed by chemical formula 4 is about 15 wt % to about 25 wt %.

5. The apparatus of claim 3, wherein the neutral compound material further comprises at least one compound expressed by one of the following chemical formulas 5, 6, 7, and 8, and wherein the first compound material further comprises at least one compound expressed by the following chemical formulas 9 and 10

Chemical Formula 5

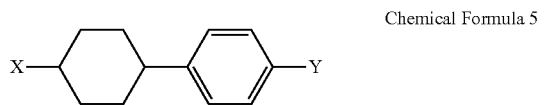

wherein, "X" denotes a hydrocarbon having 2, 3, 4, or 5 carbon molecules, and "Y" denotes an alkyl group Chemical Formula 6

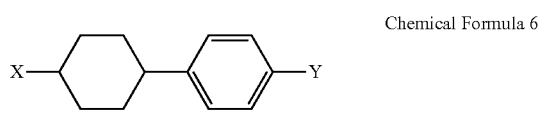

wherein, "X" denotes a hydrocarbon having 2, 3, 4, or 5 carbon molecules, and "Y" denotes an alkoxy group Chemical Formula 7

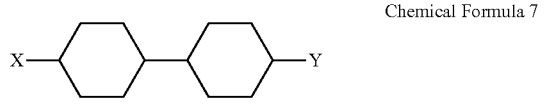

wherein, "X" denotes a hydrocarbon having 2, 3, 4, or 5 carbon molecules, and "Y" denotes an alkyl group Chemical Formula 8

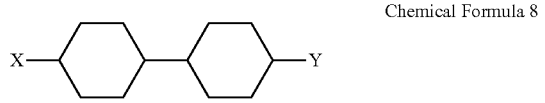

wherein, "X" denotes a hydrocarbon having 2, 3, 4, or 5 carbon molecules, and "Y" denotes an alkoxy group Chemical Formula 9

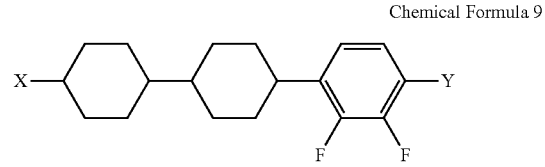

wherein, "X" denotes a hydrocarbon having 2, 3, 4, or 5 carbon molecules, and "Y" denotes an alkyl group Chemical Formula 10

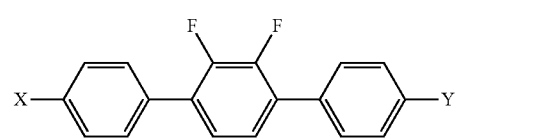

wherein, "X" denotes a hydrocarbon having 2, 3, 4, or 5 carbon molecules, and "Y" denotes an alkyl group.

6. The apparatus of claim 3, wherein the second compound material comprises at least one compound expressed by the following chemical formulas 11, 12, 13, 14, 15, 16, 17, and 18

Chemical Formula 11

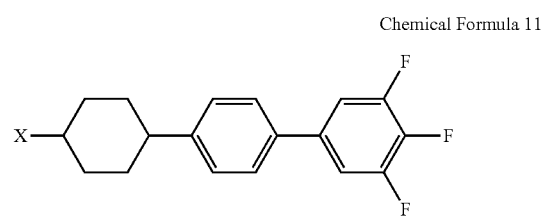

wherein, "X" denotes a hydrocarbon having 2, 3, 4, or 5 carbon molecules

Chemical Formula 12

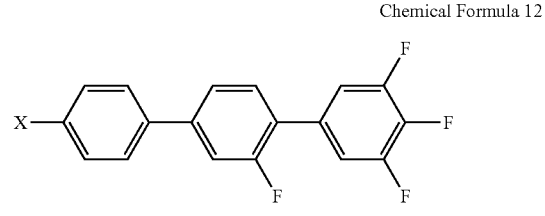

wherein, "X" denotes a hydrocarbon having 2, 3, 4, or 5 carbon molecules

Chemical Formula 13

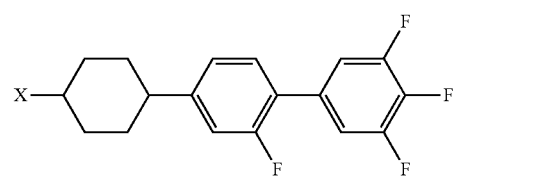

wherein, "X" denotes a hydrocarbon having 2, 3, 4, or 5 carbon molecules

Chemical Formula 14

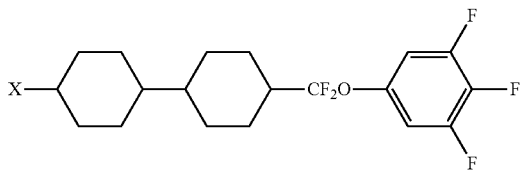

wherein, "X" denotes a hydrocarbon having 2, 3, 4, or 5 carbon molecules

Chemical Formula 15

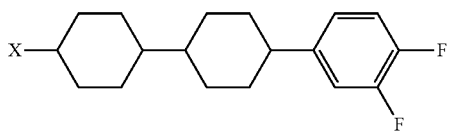

wherein, "X" denotes a hydrocarbon having 2, 3, 4, or 5 carbon molecules

Chemical Formula 16

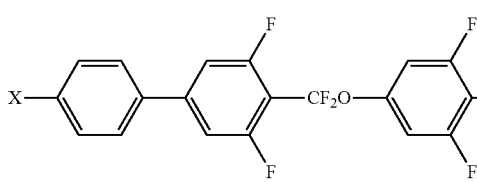

wherein, "X" denotes a hydrocarbon having 2, 3, 4, or 5 carbon molecules

Chemical Formula 17

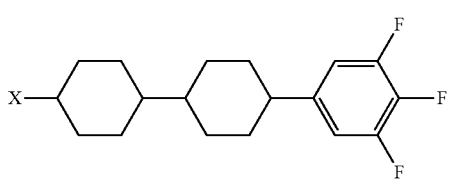

wherein, "X" denotes a hydrocarbon having 2, 3, 4, or 5 carbon molecules

Chemical Formula 18

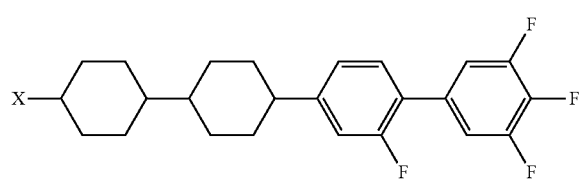

wherein, "X" denotes a hydrocarbon having 2, 3, 4, or 5 carbon molecules.

7. The apparatus of claim 6, wherein a dielectric anisotropy of the liquid crystal is within a range of about −2.6 to about −3.4.

8. The apparatus of claim 7, wherein a ratio of the dielectric anisotropy to a vertical dielectric constant of the liquid crystal is within a range of about 0.31 to about 0.46.

9. The apparatus of claim 6, wherein the liquid crystal has a phase transition temperature of about 70° C. to about 95° C. and a diffractive anisotropy of about 0.103 or the less.

10. The apparatus of claim 1, wherein the first compound material comprises at least one compound expressed by one of the following chemical formulas 1, 2, 3, 4, 5, 6, 7, and 8

Chemical Formula 1

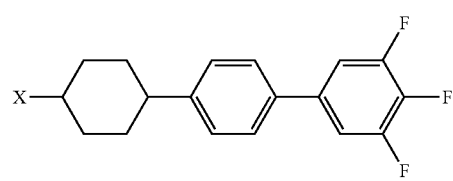

wherein, "X" denotes a hydrocarbon having 2, 3, 4, or 5 carbon molecules

Chemical Formula 2

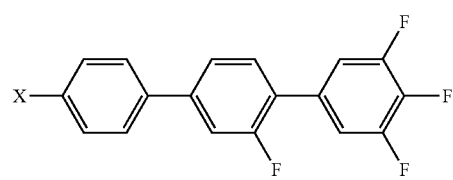

wherein, "X" denotes a hydrocarbon having 2, 3, 4, or 5 carbon molecules

Chemical Formula 3

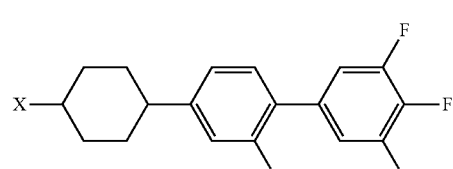

wherein, "X" denotes a hydrocarbon having 2, 3, 4, or 5 carbon molecules

Chemical Formula 4

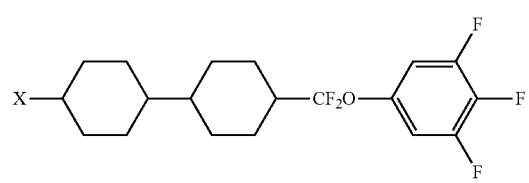

wherein, "X" denotes a hydrocarbon having 2, 3, 4, or 5 carbon molecules

Chemical Formula 5

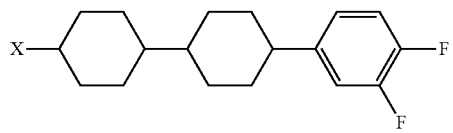

wherein, "X" denotes a hydrocarbon having 2, 3, 4, or 5 carbon molecules

Chemical Formula 6

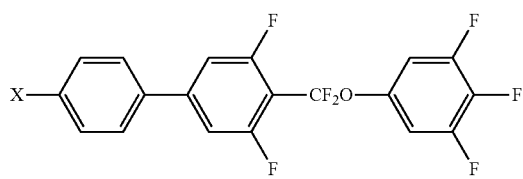

wherein, "X" denotes a hydrocarbon having 2, 3, 4, or 5 carbon molecules

Chemical Formula 7

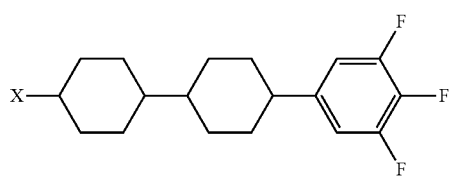

wherein, "X" denotes a hydrocarbon having 2, 3, 4, or 5 carbon molecules

Chemical Formula 8

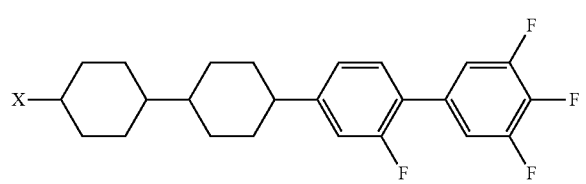

wherein, "X" denotes a hydrocarbon having 2, 3, 4, or 5 carbon molecules.

11. The apparatus as set forth in claim 10, wherein the second compound material comprises at least one compound expressed by one of the following chemical formulas 9, 10, 11, 12, and 13

Chemical Formula 9

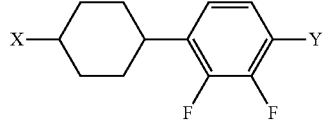

wherein, "X" denotes a hydrocarbon having 2, 3, 4, or 5 carbon molecules, and "Y" denotes an alkoxy group Chemical Formula 10

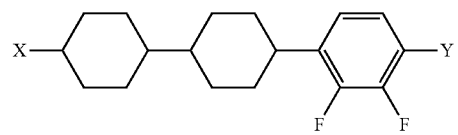

wherein, "X" denotes a hydrocarbon having 2, 3, 4, or 5 carbon molecules, and "Y" denotes an alkoxy group Chemical Formula 11

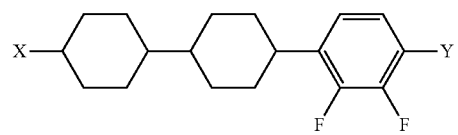

wherein, "X" denotes a hydrocarbon having 2, 3, 4, or 5 carbon molecules, and "Y" denotes an alkyl group Chemical Formula 12

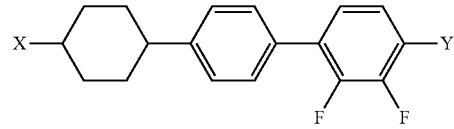

wherein, "X" denotes a hydrocarbon having 2, 3, 4, or 5 carbon molecules, and "Y" denotes an alkoxy group Chemical Formula 13

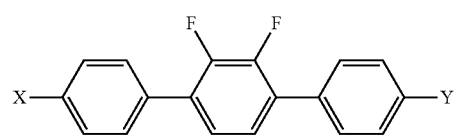

wherein, "X" denotes a hydrocarbon having 2, 3, 4, or 5 carbon molecules, and "Y" denotes an alkyl group.

12. The apparatus of claim 11, wherein the neutral compound material comprises at least one compound expressed by one of the following chemical formulas 14, 15, 16, 17, and 18

Chemical Formula 14

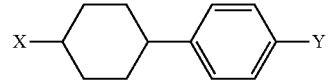

wherein, "X" denotes a hydrocarbon having 2, 3, 4, or 5 carbon molecules, and "Y" denotes an alkyl group

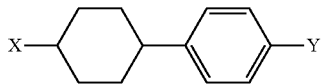

Chemical Formula 15 wherein, "X" denotes a hydrocarbon having 2, 3, 4, or 5 carbon molecules, and "Y" denotes an alkoxy group

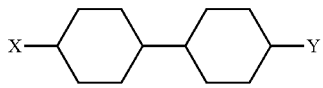

Chemical Formula 16 wherein, "X" denotes a hydrocarbon having 2, 3, 4, or 5 carbon molecules, and "Y" denotes an alkyl group

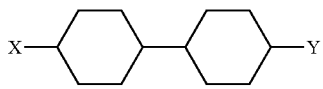

Chemical Formula 17 wherein, "X" denotes a hydrocarbon having 2, 3, 4, or 5 molecules, and "Y" denotes an alkoxy group

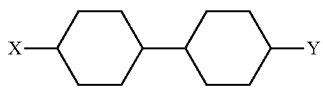

Chemical Formula 18 wherein, "X" denotes a hydrocarbon having 2, 3, 4, or 5 carbon molecules, and "Y" denotes an alkenyl group.

13. The apparatus of claim 1, further comprising:
a first domain divider arranged at the pixel electrode; and
a second domain divider arranged at the common electrode and spaced apart from the first domain divider, the first domain divider and the second domain divider dividing the pixel area into a plurality of domains,
wherein the pixel electrode comprises a first pixel electrode and a second pixel electrode having a smaller area than the first pixel electrode, wherein the first pixel electrode overlaps at least one of the gate line and the data line, and wherein a first data voltage and a second data voltage, which are different from each other, are applied to the first pixel electrode and the second pixel electrode, respectively.

14. The apparatus of in claim 1, wherein the pixel area does not have any storage capacitors.

15. A liquid crystal display apparatus, comprising:
a first substrate having a pixel area;
a gate line disposed on the first substrate;
a data line disposed across the gate line to define the pixel area at a crossing of the gate line and the data line;
a pixel electrode to receive a data voltage corresponding to an image of the pixel area, the pixel electrode being disposed in the pixel area;
a second substrate facing the first substrate;
a common electrode to receive a common voltage, the common electrode being disposed on the second substrate; and
a plurality of liquid crystals disposed between the first substrate and the second substrate,
wherein each liquid crystal comprises about 60 wt % to about 80 wt % of a first compound material having a dielectric anisotropy of a first polarity, about 2 wt % to about 15 wt % of a second compound material having a dielectric anisotropy of a second polarity, and a neutral compound material,
wherein a frame frequency of the image is about 120 Hz.

16. The apparatus of claim 15, wherein a content of the second compound material is about 2 wt % to about 7 wt %.

17. The apparatus of claim 16, wherein the neutral compound material comprises a compound expressed by the following chemical formula 1, and wherein the first compound material comprises at least one compound expressed by one of the following chemical formulas 2, 3, and 4

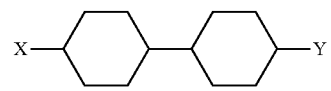

Chemical Formula 1 wherein, "X" denotes a hydrocarbon having 2, 3, 4, or 5 carbon molecules, and "Y" denotes an alkenyl group

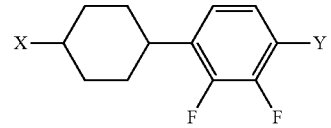

Chemical Formula 2 wherein, "X" denotes a hydrocarbon having 2, 3, 4, or 5 carbon molecules, and "Y" denotes an alkoxy group

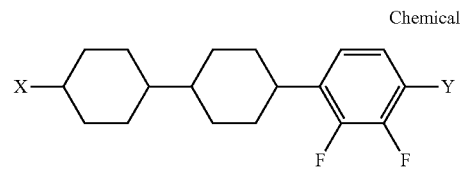

Chemical Formula 3 wherein, "X" denotes a hydrocarbon having 2, 3, 4, or 5 carbon molecules, and "Y" denotes an alkoxy group

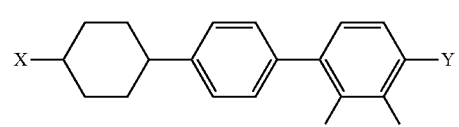

Chemical Formula 4 wherein, "X" denotes a hydrocarbon having 2, 3, 4, or 5 carbon molecules, and "Y" denotes an alkoxy group.

18. The apparatus of claim 17, wherein a content of the compound expressed by chemical formula 1 is about 25 wt % to about 35 wt %, wherein a content of the compound expressed by chemical formula 2 is about 15 wt % to about 20 wt %, wherein a content of the compound expressed by chemical formula 3 is about 20 wt % to about 30 wt %, and wherein a content of the compound expressed by chemical formula 4 is about 15 wt % to about 25 wt %.

19. The apparatus of claim 17, wherein the neutral compound material further comprises at least one compound expressed by one of the following chemical formulas 5, 6, 7, and 8, and wherein the first compound material further comprises at least one compound expressed by the following chemical formulas 9 and 10

Chemical Formula 5 wherein, "X" denotes a hydrocarbon having 2, 3, 4, or 5 carbon molecules, and "Y" denotes an alkyl group Chemical Formula 6 wherein, "X" denotes a hydrocarbon having 2, 3, 4, or 5 carbon molecules, and "Y" denotes an alkoxy group Chemical Formula 7 wherein, "X" denotes a hydrocarbon having 2, 3, 4, or 5 carbon molecules, and "Y" denotes an alkyl group Chemical Formula 8 wherein, "X" denotes a hydrocarbon having 2, 3, 4, or 5 carbon molecules, and "Y" denotes an alkoxy group Chemical Formula 9 wherein, "X" denotes a hydrocarbon having 2, 3, 4, or 5 carbon molecules, and "Y" denotes an alkyl group Chemical Formula 10

wherein, "X" denotes a hydrocarbon having 2, 3, 4, or 5 carbon molecules, and "Y" denotes an alkyl group.

20. The apparatus of claim 19, wherein the second compound material comprises at least one compound expressed by the following chemical formulas 11, 12, 13, 14, 15, 16, 17, and 18

Chemical Formula 11 wherein, "X" denotes a hydrocarbon having 2, 3, 4, or 5 carbon molecules

Chemical Formula 12 wherein, "X" denotes a hydrocarbon having 2, 3, 4, or 5 carbon molecules

Chemical Formula 13 wherein, "X" denotes a hydrocarbon having 2, 3, 4, or 5 carbon molecules

Chemical Formula 14 wherein, "X" denotes a hydrocarbon having 2, 3, 4, or 5 carbon molecules

Chemical Formula 15

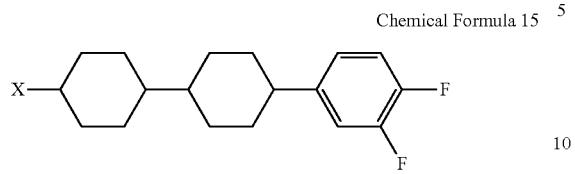

wherein, "X" denotes a hydrocarbon having 2, 3, 4, or 5 carbon molecules

Chemical Formula 16

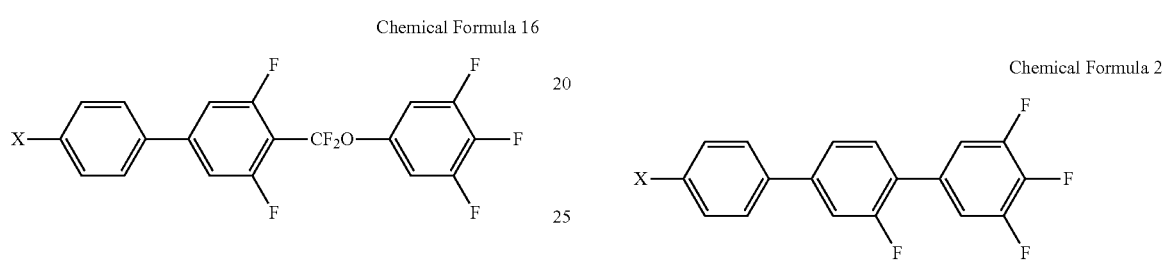

wherein, "X" denotes a hydrocarbon having 2, 3, 4, or 5 carbon molecules

Chemical Formula 17

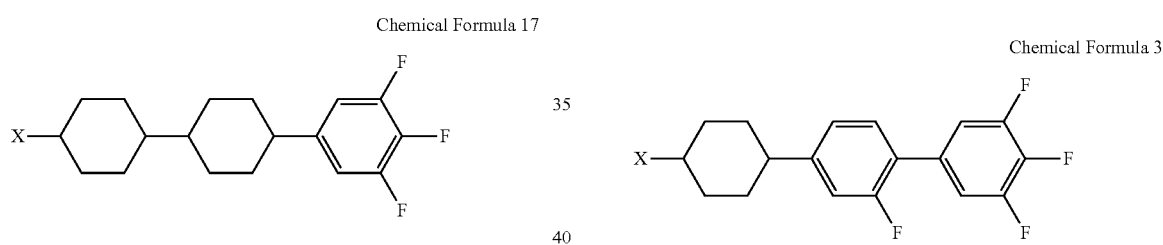

wherein, "X" denotes a hydrocarbon having 2, 3, 4, or 5 carbon molecules

Chemical Formula 18

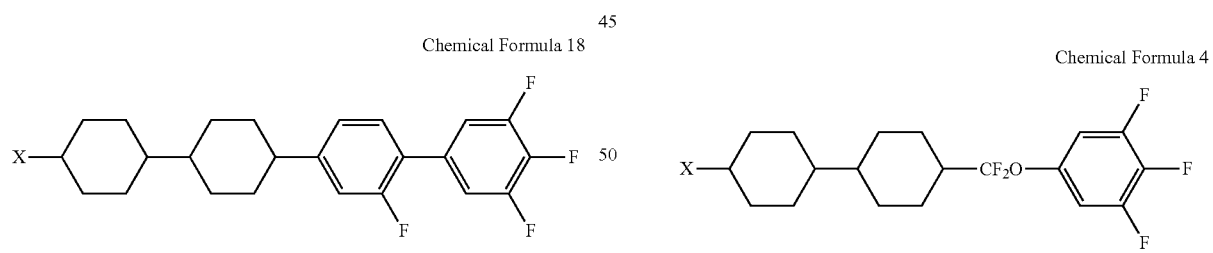

wherein, "X" denotes a hydrocarbon having 2, 3, 4, or 5 carbon molecules.

21. The apparatus of claim 20, wherein a dielectric anisotropy of the liquid crystal is within a range of about −2.6 to about −3.4.

22. The apparatus of claim 21, wherein a ratio of the dielectric anisotropy to a vertical dielectric constant of the liquid crystal is within a range of about 0.31 to about 0.46.

23. The apparatus of claim 22, wherein the liquid crystal has a phase transition temperature of about 70° C. to about 95° C. and a diffractive anisotropy of about 0.103 or the less.

24. The apparatus of claim 15, wherein the first compound material comprises at least one compound expressed by one of the following chemical formulas 1, 2, 3, 4, 5, 6, 7, and 8

Chemical Formula 1

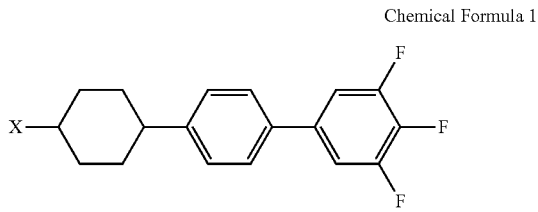

wherein, "X" denotes a hydrocarbon having 2, 3, 4, or 5 carbon molecules

Chemical Formula 2

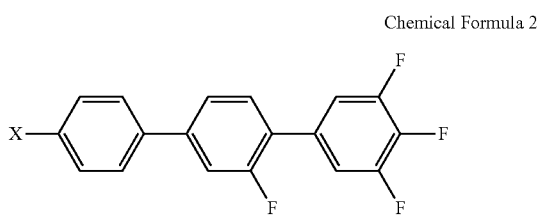

wherein, "X" denotes a hydrocarbon having 2, 3, 4, or 5 carbon molecules

Chemical Formula 3

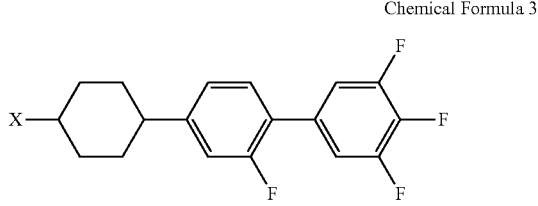

wherein, "X" denotes a hydrocarbon having 2, 3, 4, or 5 carbon molecules

Chemical Formula 4

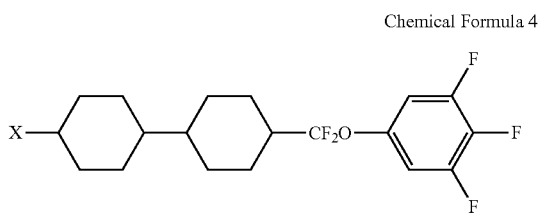

wherein, "X" denotes a hydrocarbon having 2, 3, 4, or 5 carbon molecules

Chemical Formula 5

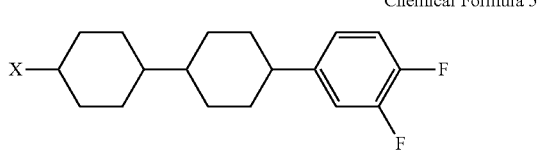

wherein, "X" denotes a hydrocarbon having 2, 3, 4, or 5 carbon molecules

Chemical Formula 16

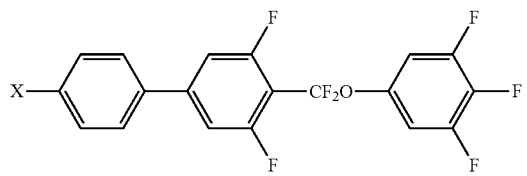

wherein, "X" denotes a hydrocarbon having 2, 3, 4, or 5 carbon molecules

Chemical Formula 7

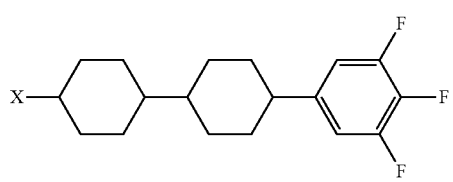

wherein, "X" denotes a hydrocarbon having 2, 3, 4, or 5 carbon molecules

Chemical Formula 8

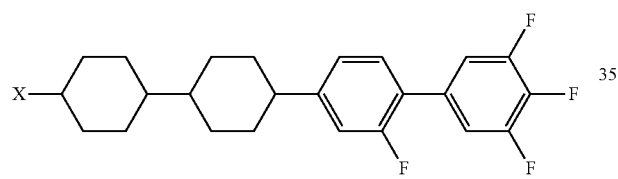

wherein, "X" denotes a hydrocarbon having 2, 3, 4, or 5 carbon molecules.

25. The apparatus as set forth in claim 24, wherein the second compound material comprises at least one compound expressed by one of the following chemical formulae 9, 15, 11, 12, and 13

Chemical Formula 9

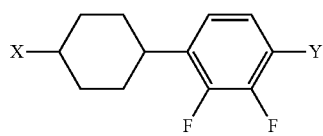

wherein, "X" denotes a hydrocarbon having 2, 3, 4, or 5 carbon molecules, and "Y" denotes an alkoxy group Chemical Formula 10

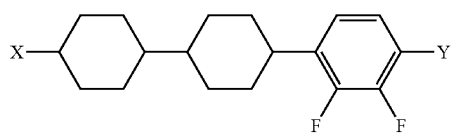

wherein, "X" denotes a hydrocarbon having 2, 3, 4, or 5 carbon molecules, and "Y" denotes an alkoxy group Chemical Formula 11

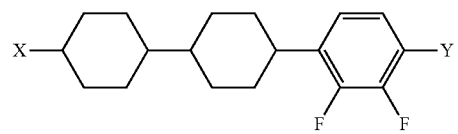

wherein, "X" denotes a hydrocarbon having 2, 3, 4, or 5 carbon molecules, and "Y" denotes an alkyl group Chemical Formula 12

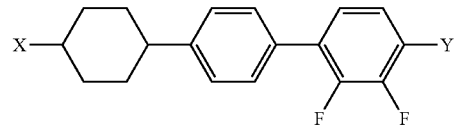

wherein, "X" denotes a hydrocarbon having 2, 3, 4, or 5 carbon molecules, and "Y" denotes an alkoxy group Chemical Formula 13

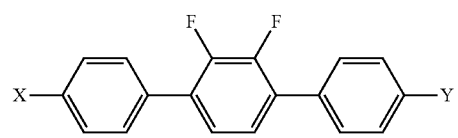

wherein, "X" denotes a hydrocarbon having 2, 3, 4, or 5 carbon molecules, and "Y" denotes an alkyl group.

26. The apparatus of claim 25, wherein the neutral compound material comprises at least one compound expressed by one of the following chemical formulas 14, 15, 16, 17, and 18

Chemical Formula 14

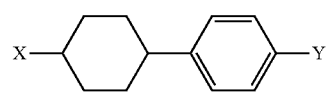

wherein, "X" denotes a hydrocarbon having 2, 3, 4, or 5 carbon molecules, and "Y" denotes an alkyl group Chemical Formula 15

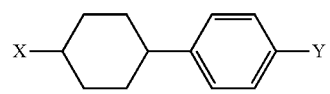

wherein, "X" denotes a hydrocarbon having 2, 3, 4, or 5 carbon molecules, and "Y" denotes an alkoxy group

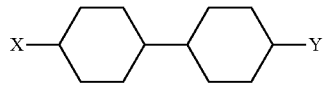

Chemical Formula 16 wherein, "X" denotes a hydrocarbon having 2, 3, 4, or 5 carbon molecules, and "Y" denotes an alkyl group

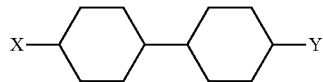

Chemical Formula 17 wherein, "X" denotes a hydrocarbon having 2, 3, 4, or 5 molecules, and "Y" denotes an alkoxy group

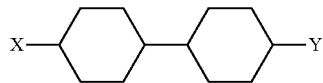

Chemical Formula 18 wherein, "X" denotes a hydrocarbon having 2, 3, 4, or 5 carbon molecules, and "Y" denotes an alkenyl group.

27. The apparatus of claim 15, further comprising:
a first domain divider arranged at the pixel electrode; and
a second domain divider arranged at the common electrode and spaced apart from the first domain divider, the first domain divider and the second domain divider dividing the pixel area into a plurality of domains,
wherein the pixel electrode comprises a first pixel electrode and a second pixel electrode having a smaller area than the first pixel electrode, wherein the first pixel electrode overlaps at least one of the gate line and the data line, and
wherein a first data voltage and a second data voltage, which are different from each other, are applied to the first pixel electrode and the second pixel electrode, respectively.

28. The apparatus of in claim 15, wherein the pixel area does not have any storage capacitors.

29. A liquid crystal display apparatus, comprising:
a first substrate having a pixel area;
a second substrate facing the first substrate; and
a plurality of liquid crystals disposed between the first substrate and the second substrate, wherein each liquid crystal comprises:
about 60 wt % to about 80 wt % of a first compound material having a dielectric anisotropy of a first polarity;
about 2 wt % to about 15 wt % of a second compound material having a dielectric anisotropy of a second polarity; and
a neutral compound material comprising a compound expressed by the following chemical formula 1, wherein the first compound material comprises at least one compound expressed by one of the following chemical formulas 2, 3, and 4, wherein a content of the compound expressed by chemical formula 1 is about 25 wt % to about 35 wt %, wherein a content of the compound expressed by chemical formula 2 is about 15 wt % to about 20 wt %, wherein a content of the compound expressed by chemical formula 3 is about 20 wt % to about 30 wt %, and wherein a content of the compound expressed by chemical formula 4 is about 15 wt % to about 25 wt %,

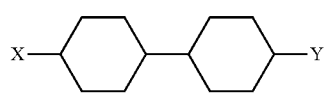

Chemical Formula 1 wherein, "X" denotes a hydrocarbon having 2, 3, 4, or 5 carbon molecules, and "Y" denotes an alkenyl group

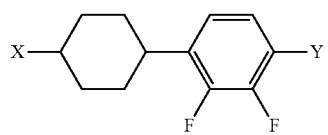

Chemical Formula 2 wherein, "X" denotes a hydrocarbon having 2, 3, 4, or 5 carbon molecules, and "Y" denotes an alkoxy group

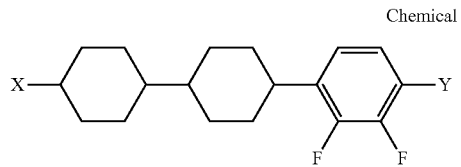

Chemical Formula 3 wherein, "X" denotes a hydrocarbon having 2, 3, 4, or 5 carbon molecules, and "Y" denotes an alkoxy group

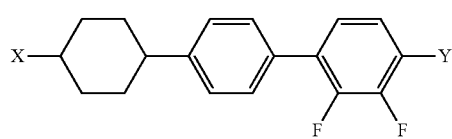

Chemical Formula 4 wherein, "X" denotes a hydrocarbon having 2, 3, 4, or 5 carbon molecules, and "Y" denotes an alkoxy group.

30. The apparatus of claim 29, wherein a content of the second compound material is about 2 wt % to about 7 wt %.

31. The apparatus of claim 30, wherein the neutral compound material further comprises at least one compound expressed by one of the following chemical formulas 5, 6, 7, and 8, and wherein the first compound material further comprises at least one compound expressed by the following chemical formulas 9 and 10

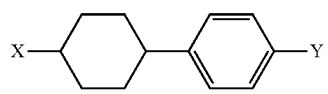

Chemical Formula 5 wherein, "X" denotes a hydrocarbon having 2, 3, 4, or 5 carbon molecules, and "Y" denotes an alkyl group Chemical Formula 6

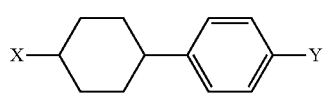

wherein, "X" denotes a hydrocarbon having 2, 3, 4, or 5 carbon molecules, and "Y" denotes an alkoxy group Chemical Formula 7

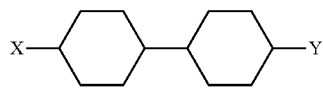

wherein, "X" denotes a hydrocarbon having 2, 3, 4, or 5 carbon molecules, and "Y" denotes an alkyl group Chemical Formula 8

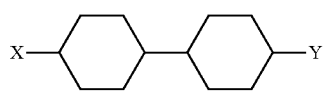

wherein, "X" denotes a hydrocarbon having 2, 3, 4, or 5 carbon molecules, and "Y" denotes an alkoxy group Chemical Formula 9

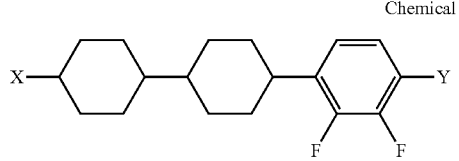

wherein, "X" denotes a hydrocarbon having 2, 3, 4, or 5 carbon molecules, and "Y" denotes an alkyl group Chemical Formula 10

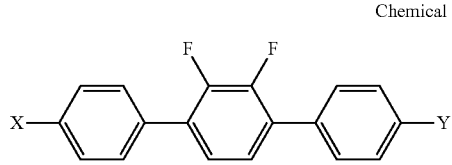

wherein, "X" denotes a hydrocarbon having 2, 3, 4, or 5 carbon molecules, and "Y" denotes an alkyl group.

32. The apparatus of claim 31, wherein the second compound material comprises at least one compound expressed by the following chemical formulas 11, 12, 13, 14, 15, 16, 17, and 18

Chemical Formula 11

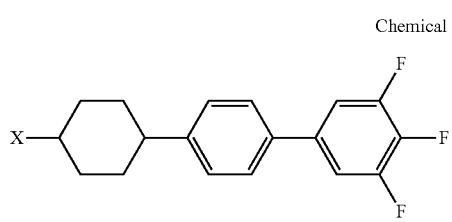

wherein, "X" denotes a hydrocarbon having 2, 3, 4, or 5 carbon molecules

Chemical Formula 12

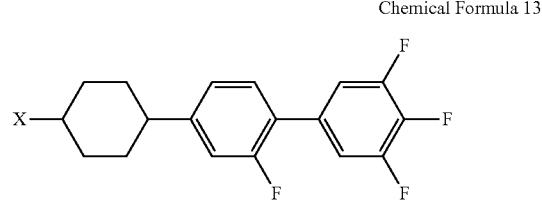

wherein, "X" denotes a hydrocarbon having 2, 3, 4, or 5 carbon molecules

Chemical Formula 13

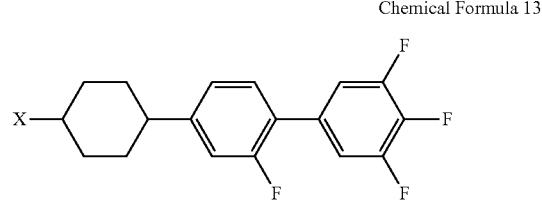

wherein, "X" denotes a hydrocarbon having 2, 3, 4, or 5 carbon molecules

Chemical Formula 14

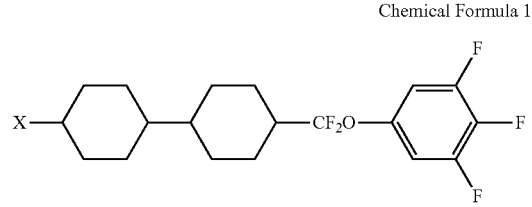

wherein, "X" denotes a hydrocarbon having 2, 3, 4, or 5 carbon molecules

Chemical Formula 15

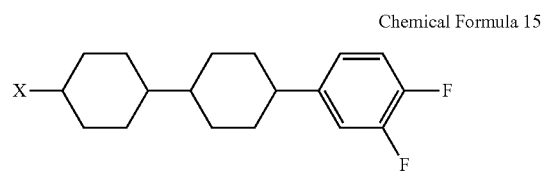

wherein, "X" denotes a hydrocarbon having 2, 3, 4, or 5 carbon molecules

Chemical Formula 16

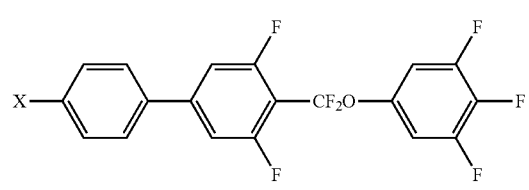

wherein, "X" denotes a hydrocarbon having 2, 3, 4, or 5 carbon molecules

Chemical Formula 17

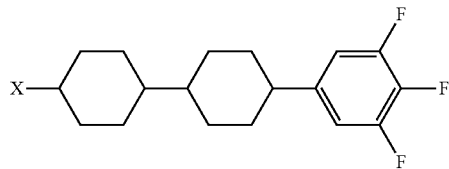

wherein, "X" denotes a hydrocarbon having 2, 3, 4, or 5 carbon molecules

Chemical Formula 18

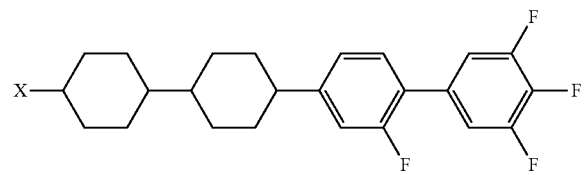

wherein, "X" denotes a hydrocarbon having 2, 3, 4, or 5 carbon molecules.

33. The apparatus of claim 32, wherein a dielectric anisotropy of the liquid crystal is within a range of about −2.6 to about −3.4.

34. The apparatus of claim 33, wherein a ratio of the dielectric anisotropy to a vertical dielectric constant of the liquid crystal is within a range of about 0.31 to about 0.46.

35. The apparatus of claim 34, wherein the liquid crystal has a phase transition temperature of about 70° C. to about 95° C. and a diffractive anisotropy of about 0.103 or the less.

36. The apparatus of claim 29, wherein the first compound material comprises at least one compound expressed by one of the following chemical formulas 1, 2, 3, 4, 5, 6, 7, and 8

Chemical Formula 1

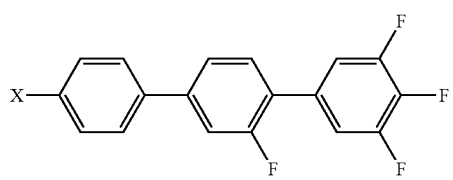

wherein, "X" denotes a hydrocarbon having 2, 3, 4, or 5 carbon molecules

Chemical Formula 2

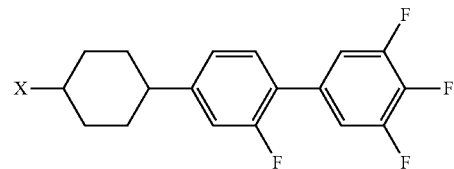

wherein, "X" denotes a hydrocarbon having 2, 3, 4, or 5 carbon molecules

Chemical Formula 3

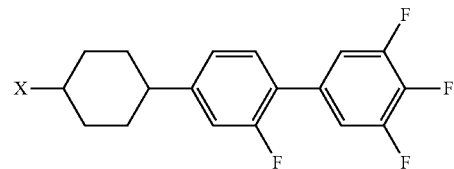

wherein, "X" denotes a hydrocarbon having 2, 3, 4, or 5 carbon molecules

Chemical Formula 4

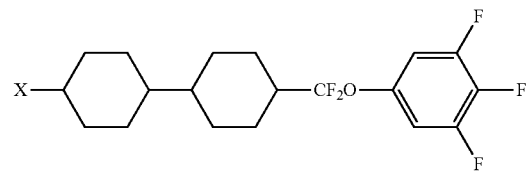

wherein, "X" denotes a hydrocarbon having 2, 3, 4, or 5 carbon molecules

Chemical Formula 5

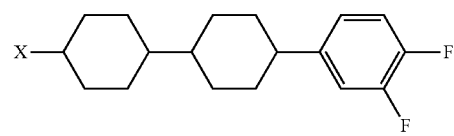

wherein, "X" denotes a hydrocarbon having 2, 3, 4, or 5 carbon molecules

Chemical Formula 6

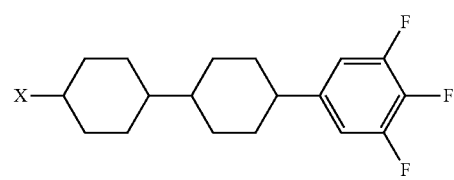

wherein, "X" denotes a hydrocarbon having 2, 3, 4, or 5 carbon molecules

Chemical Formula 7

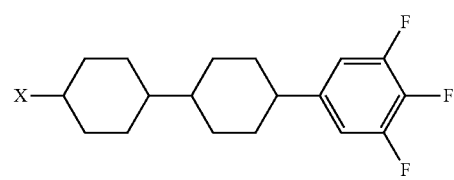

wherein, "X" denotes a hydrocarbon having 2, 3, 4, or 5 carbon molecules

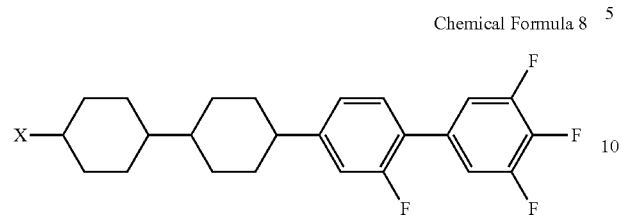

Chemical Formula 8 wherein, "X" denotes a hydrocarbon having 2, 3, 4, or 5 carbon molecules.

37. The apparatus as set forth in claim 36, wherein the second compound material comprises at least one compound expressed by one of the following chemical formula 9, 10, 11, 12, and 13

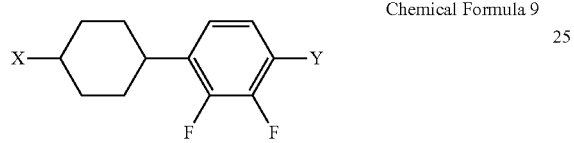

Chemical Formula 9 wherein, "X" denotes a hydrocarbon having 2, 3, 4, or 5 carbon molecules, and "Y" denotes an alkoxy group

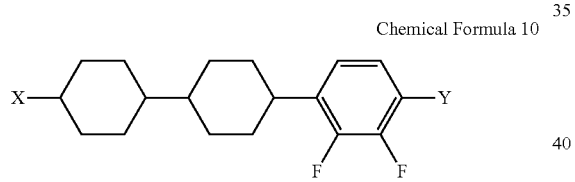

Chemical Formula 10 wherein, "X" denotes a hydrocarbon having 2, 3, 4, or 5 carbon molecules, and "Y" denotes an alkoxy group

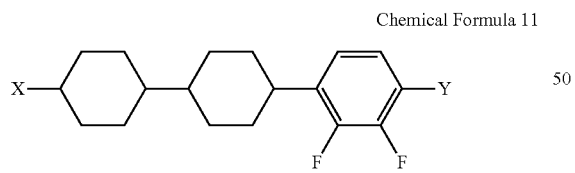

Chemical Formula 11 wherein, "X" denotes a hydrocarbon having 2, 3, 4, or 5 carbon molecules, and "Y" denotes an alkyl group

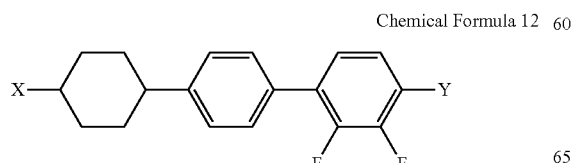

Chemical Formula 12 wherein, "X" denotes a hydrocarbon having 2, 3, 4, or 5 carbon molecules, and "Y" denotes an alkoxy group

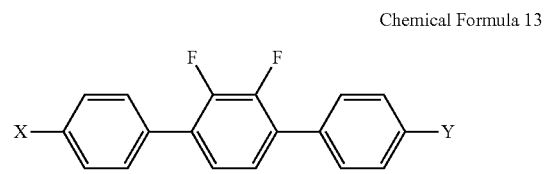

Chemical Formula 13 wherein, "X" denotes a hydrocarbon having 2, 3, 4, or 5 carbon molecules, and "Y" denotes an alkyl group.

38. The apparatus of claim 37, wherein the neutral compound material comprises at least one compound expressed by one of the following chemical formulas 14, 15, 16, 17, and 18

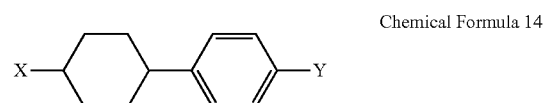

Chemical Formula 14 wherein, "X" denotes a hydrocarbon having 2, 3, 4, or 5 carbon molecules, and "Y" denotes an alkyl group

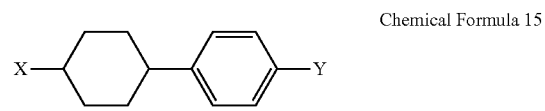

Chemical Formula 15 wherein, "X" denotes a hydrocarbon having 2, 3, 4, or 5 carbon molecules, and "Y" denotes an alkoxy group

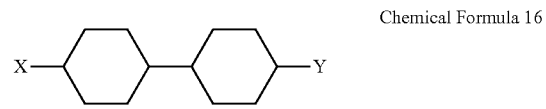

Chemical Formula 16 wherein, "X" denotes a hydrocarbon having 2, 3, 4, or 5 carbon molecules, and "Y" denotes an alkyl group

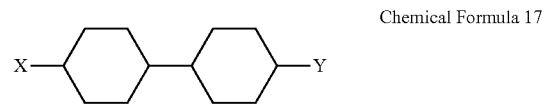

Chemical Formula 17 wherein, "X" denotes a hydrocarbon having 2, 3, 4, or 5 molecules, and "Y" denotes an alkoxy group

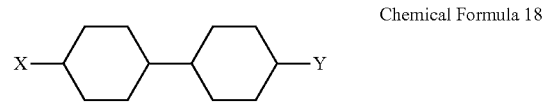

Chemical Formula 18 wherein, "X" denotes a hydrocarbon having 2, 3, 4, or 5 carbon molecules, and "Y" denotes an alkenyl group.

39. The apparatus of claim 29, further comprising:

a gate line disposed on the first substrate;

a data line disposed across the gate line to define the pixel area at a crossing of the gate line and the data line;

a pixel electrode to receive a data voltage corresponding to an image of the pixel area, the pixel electrode being disposed in the pixel area; and a common electrode to receive a common voltage, the common electrode being disposed on the second substrate, wherein the pixel electrode overlaps at least one of the gate line and the data line.

40. The apparatus of claim 29, further comprising:

a gate line disposed on the first substrate;

a data line disposed across the gate line to define the pixel area at a crossing of the gate line and the data line;

a pixel electrode to receive a data voltage corresponding to an image of the pixel area, the pixel electrode being disposed in the pixel area; and a common electrode to receive a common voltage, the common electrode being disposed on the second substrate, wherein a frame frequency of the image is about 120 Hz.

41. The apparatus of claim 39, further comprising:

a first domain divider arranged at the pixel electrode; and a second domain divider arranged at the common electrode and spaced apart from the first domain divider, the first domain divider and the second domain divider dividing the pixel area into a plurality of domains, wherein the pixel electrode comprises a first pixel electrode and a second pixel electrode having a smaller area than the first pixel electrode, wherein the first pixel electrode overlaps at least one of the gate line and the data line, and wherein a first data voltage and a second data voltage, which are different from each other, are applied to the first pixel electrode and the second pixel electrode, respectively.

42. The apparatus of in claim 39, wherein the pixel area does not have any storage capacitors.

* * * * *